US010542188B2

(12) United States Patent
Shimamura et al.

(10) Patent No.: US 10,542,188 B2
(45) Date of Patent: Jan. 21, 2020

(54) IMAGE PROCESSING APPARATUS, IMAGE PROCESSING METHOD, AND STORAGE MEDIUM FOR REMOVING A DESIGNATED COLOR FROM AN IMAGE

(71) Applicant: CANON KABUSHIKI KAISHA, Tokyo (JP)

(72) Inventors: Koya Shimamura, Tokyo (JP); Kimimori Eguchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/040,161

(22) Filed: Jul. 19, 2018

(65) Prior Publication Data
US 2019/0045087 A1    Feb. 7, 2019

(30) Foreign Application Priority Data

Aug. 1, 2017   (JP) .................................. 2017-149312

(51) Int. Cl.
*G06F 3/08*         (2006.01)
*H04N 1/60*         (2006.01)

(52) U.S. Cl.
CPC ......... *H04N 1/6075* (2013.01); *H04N 1/6005* (2013.01); *H04N 1/6025* (2013.01)

(58) Field of Classification Search
None
See application file for complete search history.

(56) References Cited

U.S. PATENT DOCUMENTS

| 8,253,981 B2 | 8/2012 | Eguchi ........................... 358/3.1 |
| 8,416,460 B2 | 4/2013 | Eguchi ......................... 358/3.26 |
| 2008/0247642 A1 | 10/2008 | Eguchi ........................... 382/167 |
| 2014/0043628 A1* | 2/2014 | Kishino ............. G06K 15/1878 358/1.9 |
| 2015/0281520 A1* | 10/2015 | Sawada ............. H04N 1/40093 358/474 |
| 2018/0124285 A1 | 5/2018 | Eguchi ................. H04N 1/6019 |

FOREIGN PATENT DOCUMENTS

JP         2011-188484         9/2011

* cited by examiner

*Primary Examiner* — Henok Shiferaw
(74) *Attorney, Agent, or Firm* — Venable LLP

(57) ABSTRACT

An image processing apparatus receives designation of a target color to be removed, obtains the hue and chroma of the designated color, determines the target color based on the obtained hue and chroma, and replaces the signal value of a pixel contained in image data and having a signal value corresponding to a color falling within a predetermined range containing the designated color with a signal value indicating white, thereby performing color removal.

19 Claims, 21 Drawing Sheets

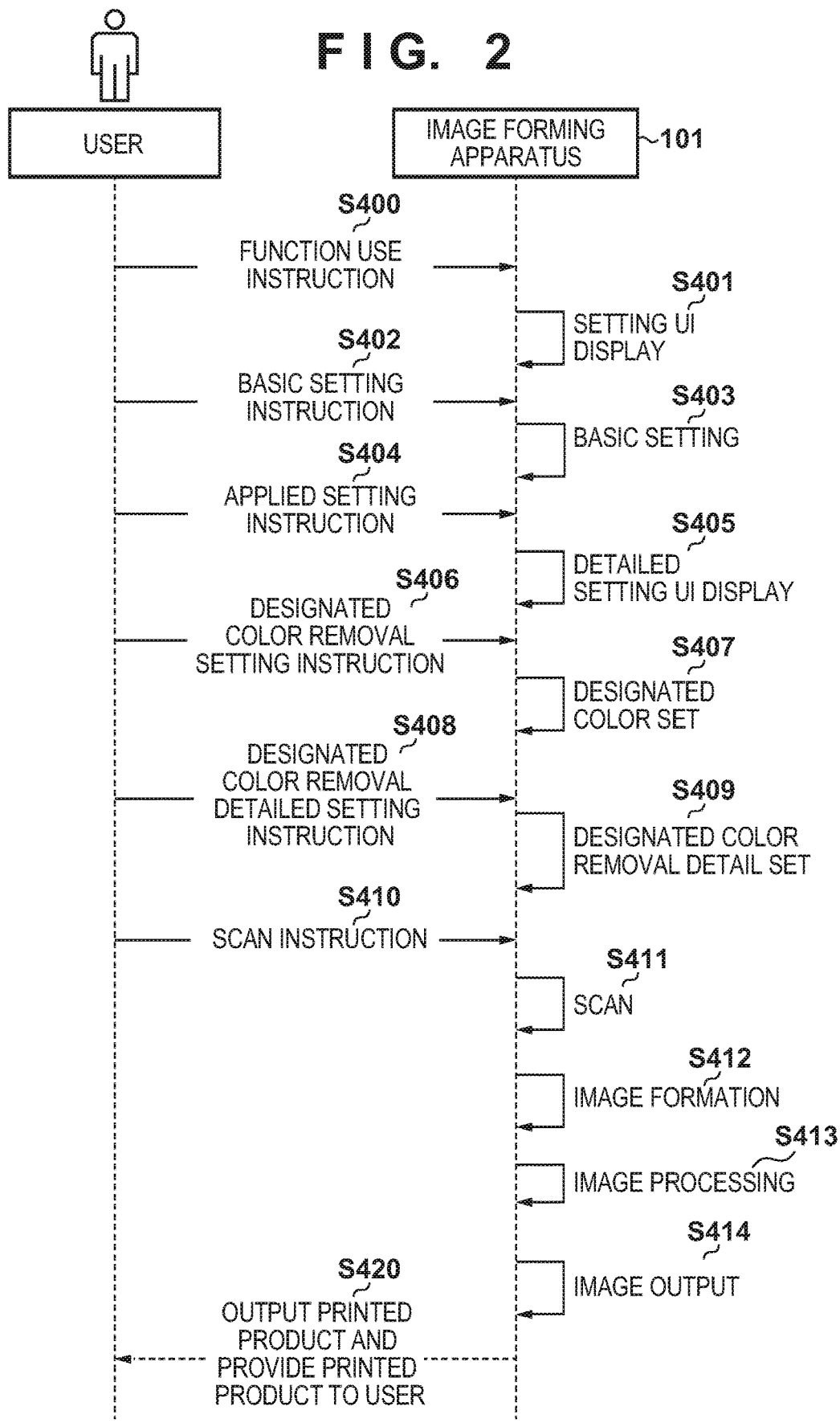

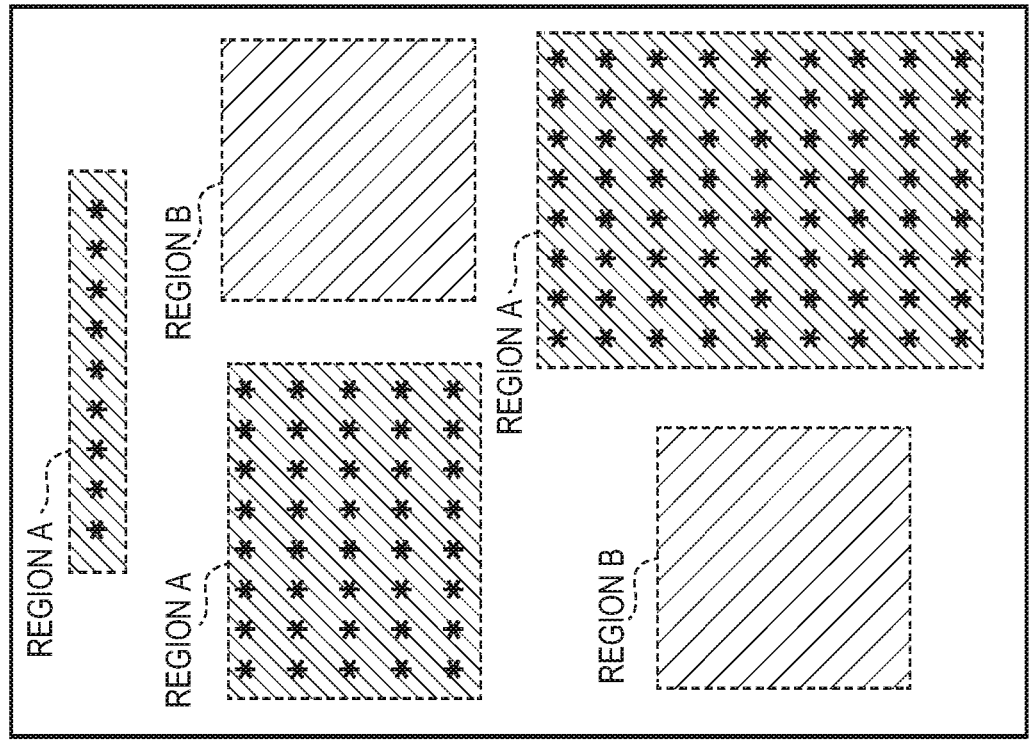
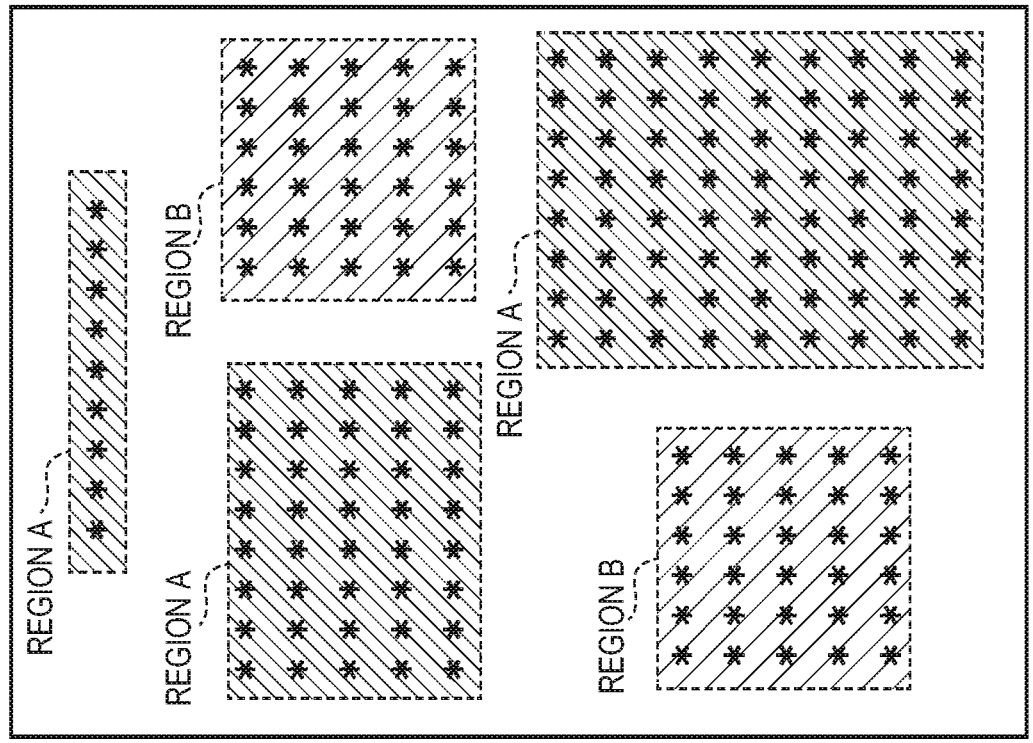

FIG. 7

| Index | INPUT R | INPUT G | INPUT B | OUTPUT R | OUTPUT G | OUTPUT B |
|---|---|---|---|---|---|---|
| 0 | 0 | 0 | 0 | 0 | 0 | 0 |
| 1 | 0 | 0 | 15 | 0 | 0 | 19 |
| 2 | 0 | 0 | 30 | 0 | 0 | 39 |
| ⋮ | | | | | | |
| 15 | 0 | 0 | 255 | 0 | 0 | 255 |
| 16 | 0 | 15 | 0 | 0 | 19 | 0 |
| 17 | 0 | 15 | 15 | 0 | 20 | 15 |
| ⋮ | | | | | | |
| 4094 | 255 | 255 | 240 | 252 | 251 | 240 |
| 4095 | 255 | 255 | 255 | 255 | 255 | 255 |

THREE-DIMENSIONAL LUT

↑ R'(8bit)  ↑ G'(8bit)  ↑ B'(8bit)

↑ R(8bit)  ↑ G(8bit)  ↑ B(8bit)

F I G. 10A

VARIOUS PARAMETERS

| | PARAMETER | RED | GREEN | BLUE | BLACK | REMARKS |
|---|---|---|---|---|---|---|
| DEFAULT (=def) | CHROMA WIDTH THRESHOLD | 32 | 32 | 32 | 32 | (VALUE RANGE: 0~128) |
| | HUE CENTRAL ANGLE | 340° | 200° | 100° | NONE | (VALUE RANGE: 0°~359°) |
| | HUE WIDTH THRESHOLD | 30° | 25° | 35° | NONE | (VALUE RANGE: 0°~179°) |
| IN REMOVAL RANGE WIDENING MODE | CHROMA WIDTH THRESHOLD | def−16 | def−12 | def−10 | def+16 | — |
| | HUE CENTRAL ANGLE | SAME AS def | SAME AS def | SAME AS def | NONE | — |
| | HUE WIDTH THRESHOLD | def+5° | def+15° | def+10° | NONE | — |

FIG. 10B

HUE CENTRAL ANGLE PARAMETERS WHEN TINT IS ADJUSTED

| | ADJUSTMENT WIDTH | HUE CENTRAL ANGLE |
|---|---|---|
| HUE CENTRAL ANGLES WHEN RED IS DESIGNATED (TINT IS ADJUSTED) | NEAR MAGENTA(Level2) | def+20° |
| | NEAR MAGENTA(Level1) | def+10° |
| | def | 340° |
| | NEAR YELLOW(Level1) | def-10° |
| | NEAR YELLOW(Level2) | def-20° |
| HUE CENTRAL ANGLES WHEN GREEN IS DESIGNATED (TINT IS ADJUSTED) | NEAR YELLOW(Level2) | def+20° |
| | NEAR YELLOW(Level1) | def+10° |
| | def | 200° |
| | NEAR CYAN(Level1) | def-10° |
| | NEAR CYAN(Level2) | def-20° |
| HUE CENTRAL ANGLES WHEN BLUE IS DESIGNATED (TINT IS ADJUSTED) | NEAR (Level2) | def+20° |
| | NEAR CYAN(Level1) | def+10° |
| | def | 100° |
| | NEAR MAGENTA(Level1) | def-10° |
| | NEAR MAGENTA(Level2) | def-20° |

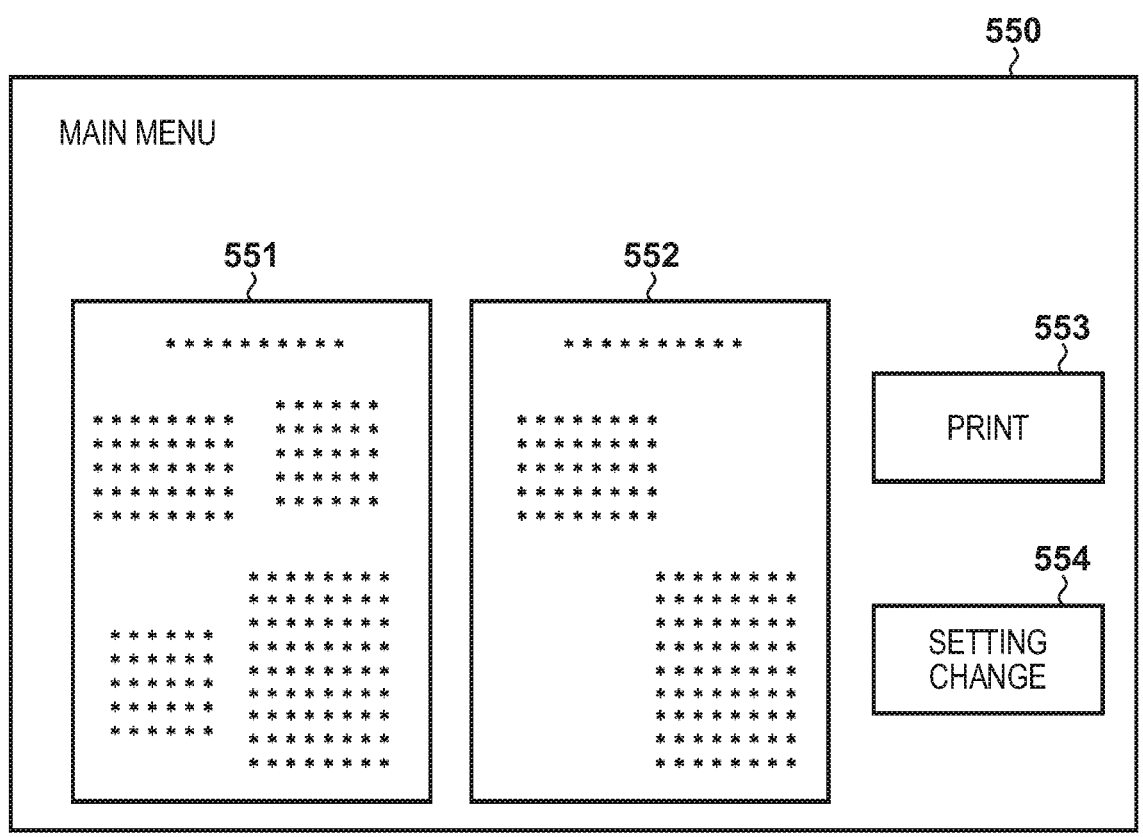
F I G. 12

IMAGE PROCESSING APPARATUS, IMAGE PROCESSING METHOD, AND STORAGE MEDIUM FOR REMOVING A DESIGNATED COLOR FROM AN IMAGE

BACKGROUND OF THE INVENTION

Field of the Invention

The present invention relates to an image processing apparatus and image processing method and, more particularly, to an image processing apparatus and image processing method which remove an arbitrary color designated by a user from an image.

Description of the Related Art

Presently, an image is output by performing a printing process by using an image forming apparatus such as an SFP or MFP, and a scanning process is performed on the output product by using an MFP or scanner, thereby copying, saving, or transmitting the image. Various kinds of image processing are performed on the input image even in the scanning process performed by the MFP or scanner. The image processing includes a process of removing a specific color component from color components contained in image data obtained by scanning a document on which an image is printed or written. When outputting the image data in this process, an image is generated by removing a region having a specific color component by replacing the region with a colorless or white region, and the generated image is copied, saved, or transmitted. This process of removing a specific color component is called designated color removal or color dropout color (to be referred to as designated color removal hereinafter).

This technique of designated color removal also has many variations. For example, the removal of green is implemented by replacing green pixels in a read image with white pixels. When green is removed by using any of these techniques from a document on which the frame of a form is drawn in green, only the portion drawn in green is removed and whitened while colors other than the green on the document are maintained. This achieves not only an effect of improving the readability by eliminating extra color information, but also an effect of improving the accuracy of an OCR or the like by removing the form frame.

As another example, characters are written with a marker such as a red pen on a document printed by black toner, and the document is read. When removing red from this image, red pixels in the read image can be replaced with white pixels. This achieves an effect of removing only the characters additionally written by the red pen marker, thereby leaving only the image printed by the black toner behind.

As this designated color removal processing method, Japanese Patent Laid-Open No. 2011-188484 has disclosed a method of specifying the color space of a three-dimensional LUT (Look-up Table) corresponding to a color to be removed designated by a user, and converting the LUT value in this color space into a predetermined pixel value such as white. In addition, as a method of specifying the color space in which this designated color removal is performed, a method of determining a region to be removed based on the hue angle and hue width on a color difference plane is disclosed.

In the method disclosed in Japanese Patent Laid-Open No. 2011-188484 and the like, a user can very finely set a color to be removed. Since, however, color removal is performed based on only the hue angle on a color difference plane, a low-chroma color of the designated color is also removed. In addition, it is impossible to designate and remove achromatic colors such as black and gray. That is, a color to be removed can be designated and removed by only the hue.

SUMMARY OF THE INVENTION

The present invention provides an image processing apparatus and image processing method capable of designating a color by using not only the hue but also other factors, and removing the designated color.

The present invention has the following arrangement.

According to an aspect of the present invention, there is provided an image processing apparatus comprising: a receiving unit configured to receive designation of a color to be replaced with a white pixel in a scanned image; and a replacing unit configured to replace a pixel of a color having not less than a first chroma falling within a hue range containing the designated color and larger than zero with the white pixel if the designated color is a chromatic color, and replace a pixel of a color having not more than a second chroma larger than zero with the white pixel if the designated color is black.

According to another aspect of the present invention, there is provided an image processing method comprising: receiving designation of a color to be replaced with a white pixel in a scanned image; and replacing a pixel of a color having not less than a first chroma falling within a hue range containing the designated color and larger than zero with the white pixel if the designated color is a chromatic color, and replacing a pixel of a color having not more than a second chroma larger than zero with the white pixel if the designated color is black.

According to still another aspect of the present invention, there is provided a non-transitory computer-readable storage medium storing a program, which causes a computer to execute an image processing method by executing the program, the method comprising: receiving designation of a color to be replaced with a white pixel in a scanned image; and replacing a pixel of a color having not less than a first chroma falling within a hue range containing the designated color and larger than zero with the white pixel if the designated color is a chromatic color, and replacing a pixel of a color having not more than a second chroma larger than zero with the white pixel if the designated color is black.

The present invention makes it possible to designate a color by using not only the hue but also other factors, and remove the designated color.

Further features of the present invention will become apparent from the following description of exemplary embodiments (with reference to the attached drawings).

BRIEF DESCRIPTION OF THE DRAWINGS

FIG. 2 is a sequence diagram showing exchange between a user and the image forming apparatus;

FIG. 4A is a view showing a sample image before the process of designated color removal;

FIG. 4B is a view showing a sample image after the process of designated color removal;

FIG. 7 is a view showing an example of three-dimensional LUT processing;

FIG. 10A is a view showing parameters to be used in designated color removal;

FIG. 10B is a view showing parameters to be used in designated color removal;

FIG. 12 is a view showing an example of a UI for checking the designated color removal result;

DESCRIPTION OF THE EMBODIMENTS

Embodiments according to the present invention will be explained in detail below. However, constituent elements described in the following embodiments are merely examples, and are not intended to restrict the scope of the invention.

First Embodiment

<Overall System Configuration>

Figure 1:
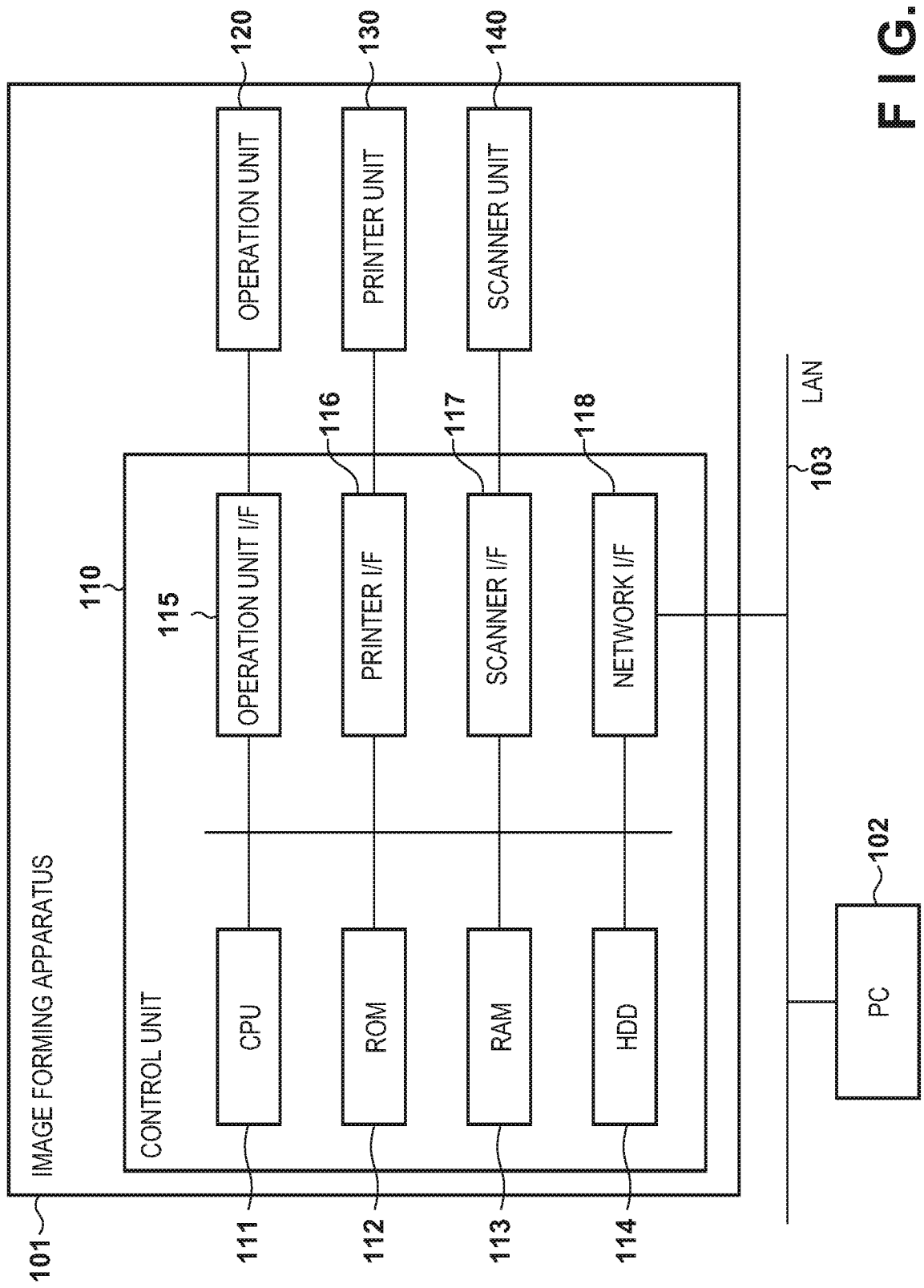
FIG. 1 is a view showing the hardware configuration of an image forming apparatus 101.

FIG. 1 is a view showing the overall configuration of a printing system according to this embodiment. This printing system shown in FIG. 1 includes an image forming apparatus 101 as a printer capable of a copying process as well and a PC 102, and the image forming apparatus 101 and PC 102 are connected to each other by a LAN 103. The PC 102 transmits printing target image data (to be referred to as "PDL data" hereinafter) described by a PDL (Page Description Language) to the image forming apparatus 101 across the LAN 103, and the image forming apparatus 101 prints out the data. FIG. 1 also shows the internal arrangement (hardware configuration) of the image forming apparatus 101. The internal arrangement of the image forming apparatus 101 will be explained below. Note that the image forming apparatus 101 has an image processing function and will sometimes be called an image processing apparatus from this viewpoint.

A control unit 110 including a CPU 111 controls the operation of the whole image forming apparatus 101. The CPU 111 reads out a control program stored in a ROM 112 and performs various kinds of control such as read control and transmission control. The CPU 111 can be a single processor, and can also include a plurality of processors. A RAM 113 is used as a main memory of the CPU 111, and as a temporary storage area such as a work area.

An HDD 114 stores image data, various programs, and various information tables. An operation unit I/F 115 is an interface which connects an operation unit 120 and the control unit 110. The operation unit 120 includes a liquid crystal display having a touch panel function and a keyboard, and functions as a user interface for receiving various input operations from the user. The operation unit 120 also includes a user authentication unit (not shown) for receiving an authentication operation when performing user authentication by using an ID card or the like.

A printer I/F 116 is an interface which connects a printer unit 130 and the control unit 110. Image data to be printed by the printer unit 130 is input from the control unit 110 via the printer I/F 116. Then, the printer unit 130 prints an image corresponding to the input image data on a printing medium such as paper by using a predetermined method (in this embodiment, an electrophotographic method).

A scanner I/F 117 is an interface which connects a scanner unit 140 and the control unit 110. The scanner unit 140 reads an image on a document set on a document table or ADF (Auto Document Feeder) (neither is shown), and generates image data (scanned image data). The generated scanned image data is input to the control unit 110 via the scanner I/F 117.

A network I/F 118 is an interface which connects the control unit 110 (image forming apparatus 101) to the LAN 103. The network I/F 118 transmits image data and information to an external apparatus (for example, a cloud service server) (not shown) on the LAN 103, and receives various kinds of information from an external apparatus on the LAN 103.

<Copy Function Execution Process>

A process of performing exchange between the user and image forming apparatus 101 in order to execute the copy function will be explained in detail below with reference to a sequence diagram shown in FIG. 2 and UI views shown in FIGS. 3A to 3E. The CPU 111 of the image forming apparatus 101 implements this process by reading out the control program stored in the ROM 112 and executing the readout control program.

In function use instruction S400, the image forming apparatus 101 receives pressing on the operation unit 120 by the user, thereby receiving an instruction to start the copy function. A main menu UI 500 displayed on the operation panel 120 shown in FIG. 3A displays functions performable by the image forming apparatus 101 as buttons. Examples are a copy function button 501, a scan and transmission function button 502, a scan and save function button 503, a saved file utilization function button 504, and a print function button 505. The image forming apparatus 101 receives a selection of a function to be performed selected from these function buttons by the user. When instructing the copy function to start, the image forming apparatus 101 receives pressing of the copy function button 501 by the user, and executes function use instruction S400.

Figure 3A:
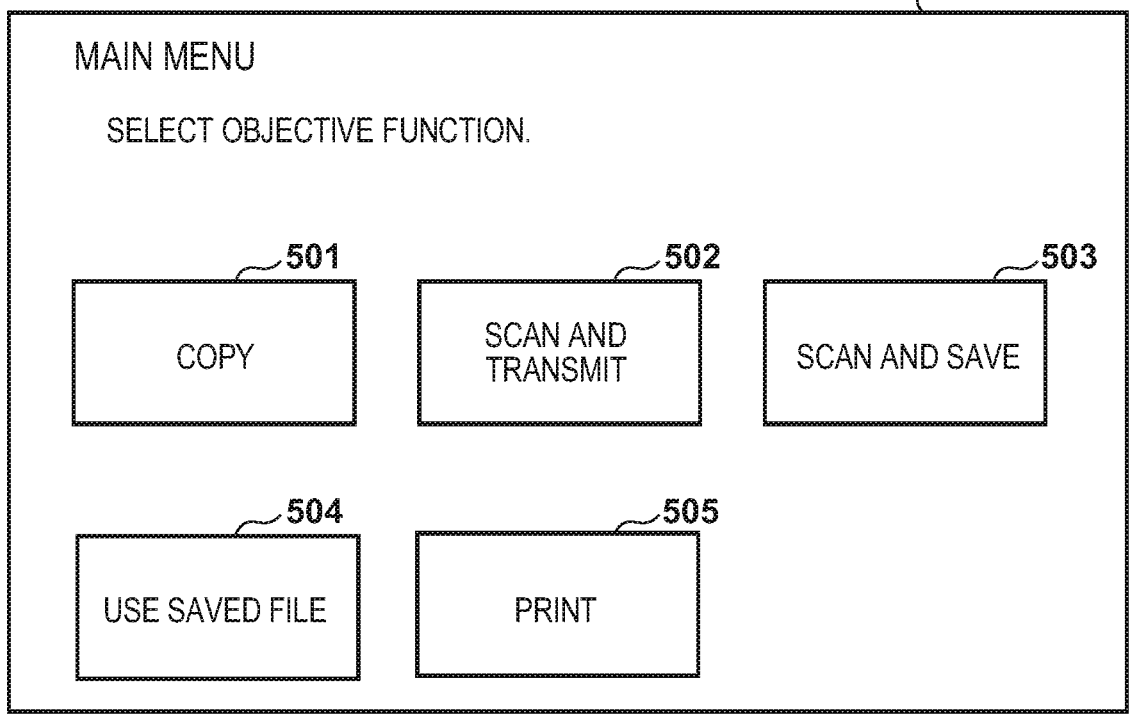
FIG. 3A is a view showing an example of a UI for removing a designated color.
Figure 3B:
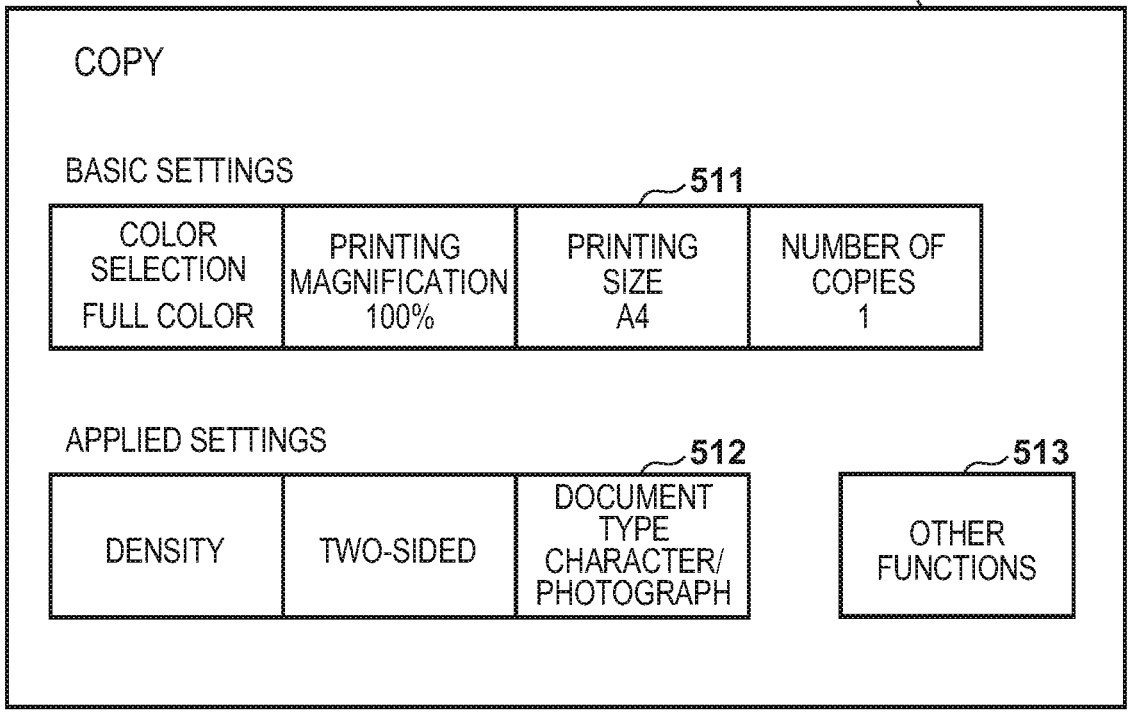
FIG. 3B is a view showing an example of a UI for removing a designated color.
Figure 3C:
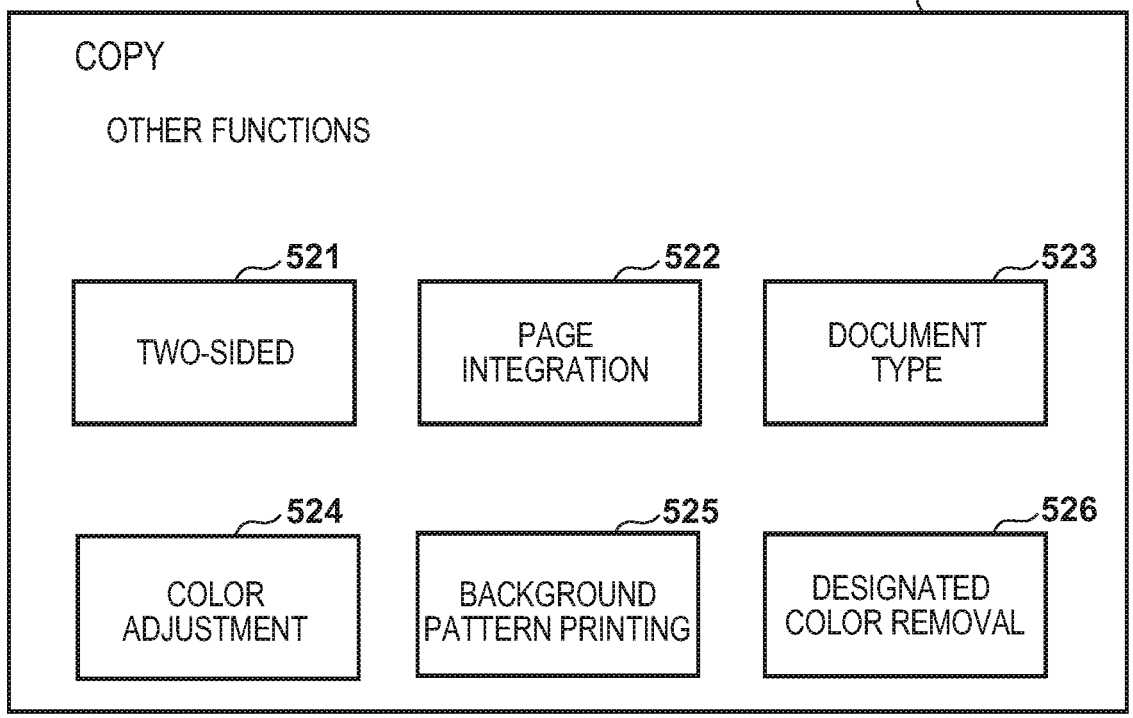
FIG. 3C is a view showing an example of a UI for removing a designated color.

In setting UI display S401, the operation unit 120 of the image forming apparatus 101 displays an initial state screen of various settings of the copy function. A copy setting UI 510 displayed on the operation unit 120 shown in FIG. 3B shows the states of the various settings of the copy function. For example, basic settings 511 display the states of color selection and magnification selection of printing, document/printing size selection, and copy count selection. Copy applied settings 512 display settings to be used often among other copy functions, such as printing density adjustment selection, two-sided printing selection, and a document type. In addition, other function settings 513 display buttons settable to select applied functions to be used in specific uses.

In basic setting instruction S402, the image forming apparatus 101 receives copy function basic setting designation from the user. For example, the image forming apparatus 101 receives pressing of the basic settings 511, and receives designation of color selection and magnification selection of printing, document/printing size selection, and copy count selection.

In basic setting S403, the copy function basic settings selected by the user are stored as set values in the RAM 114 of the image forming apparatus 101.

In applied setting instruction S404, the image forming apparatus 101 receives copy function applied setting instruction from the user. For example, the image forming apparatus 101 receives pressing of the copy applied settings 512 and other function settings 513, and receives an instruction to perform settings for selecting applied functions. The image forming apparatus 101 receives pressing of the other function settings 513 from the user, and displays a UI shown in FIG. 3C on the operation unit 120. An "other functions" setting UI 520 displays various applied functions of the copy function, which can be executed by the image forming apparatus 101. Examples are a two-sided printing selection button 521, a page integration selection button 522, a document type selection button 523, a color adjustment button 524, a background pattern printing selection button 525, and a designated color removal selection button 526.

In detailed setting UI display S405, the image forming apparatus 101 displays a UI which allows the user to perform detailed settings of the applied settings corresponding to applied setting instruction S404. When performing designated color removal, the image forming apparatus 101 receives pressing of the designated color removal selection button 526 by the user, and causes the operation unit 120 to display a designated color removal detailed setting screen 530 shown in FIG. 3D.

In designated color removal setting instruction S406, the image forming apparatus 101 receives selection of a specific color component to be removed from the user. For example, selection 531 of red as a designated color, selection 532 of green as a designated color, selection 533 of blue as a designated color, and selection 534 of black as a designated color can be selected. Note that the types of designatable colors need not be these four colors, that is, red, blue, green, and black, and may also be other colors. The image forming apparatus 101 receives pressing of one of the selection 531 of red as a designated color, selection 532 of green as a designated color, selection 533 of blue as a designated color, and selection 534 of black, and receives designation of a color to be removed. This embodiment will be explained by assuming that the user has designated the selection 531 of red as a designated color.

In designated color set S407, the image forming apparatus 101 stores the target color to be removed selected by the user in designated color removal setting instruction S406, as a set value in the RAM 114.

In designated color removal detailed setting instruction S408, more detailed designated color removal setting tuning can be selected. For example, after the designated color is determined, it is possible to widen the designated color removal range, thereby removing the color from a broader range. Consequently, there is a removal range widening mode which allows settings capable of removing a chromatic color close to an achromatic color, and capable of color removal on a document having caused color misregistration during printing. In addition, after the designated color is determined, it is possible to perform settings capable of changing the hue of the designated color. For example, when a tint adjustment mode 536 is selected after the selection 531 of red as a designated color is selected, a tint adjustment setting UI 540 is displayed on the operation panel 120 shown in FIG. 3E. Even when red is selected as the designated color, the tint of the color to be designated can be adjusted to, for example, red near magenta or red near yellow. For example, when removing red near magenta, "near magenta" is selected by pressing 542. "Near magenta" is to set a hue on the magenta side in a hue circle on a color difference plane. When removing red near yellow, "near yellow" is selected by pressing 543. The adjusted setting is confirmed by a mark 541.

A case in which red is designated has been explained in this embodiment, but the settings can be performed for blue and green, and adjustment to the color direction of the designated color can be performed. In this embodiment, however, tint adjustment is permitted only when the designated color is a chromatic color. Note that when "widen removal range" 535 is selected on the detailed setting screen 530 shown in FIG. 3D, the color range is extended for the hue and chroma when the color range is a chromatic color, and is extended for the chroma when the color range is an achromatic color. Details will be described later with reference to FIGS. 10A and 10B.

In designated color removal detail set S409, the image forming apparatus 101 stores the more detailed settings of designated color removal selected by the user in designated color removal detailed setting instruction S408, as set values in the RAM 114 of the image forming apparatus 101.

Subsequently, in scan instruction S410, the image forming apparatus 101 receives scan execution from the user, and issues an instruction to execute a scan operation. In scan S411, the image forming apparatus 101 causes the scanner unit 140 to drive a scanner and read a document placed on a glass plate of the scanner, or a document set on an ADF (Auto Document Feeder). In image formation S412, the image forming apparatus 101 converts the image read in scan S411 into a bitmap image which can be processed in image processing.

In image processing S413, when the copy function is selected, the image forming apparatus 101 acquires the scan image generated in image formation S412, and performs image processing for copying. Note that designated color removal is performed in this processing.

In image output S414, the generated image is printed. When printing is executed, the image forming apparatus 101 outputs a document as a copying result printed by the printer unit 130. Details of S412, S413, and S414 will be described later. The printed document is provided for the user in S420.

FIG. 4A shows an example of the document read in scan S411. FIG. 4B shows an example of the document printed in image output S414. On the document shown in FIG. 4A, characters and the like formed by using black toner are written in regions indicated by region A shown by a pattern of oblique lines declining to the left, and characters and the like formed by using red toner are written in regions indicated by region B shown by a lattice pattern. Note that symbol "*" indicates a portion where a character is written. On the document shown in FIG. 4B, the characters and the like formed by using black toner in region A shown by the pattern of oblique lines declining to the left are directly copied and printed. On the other hand, the characters and the like formed by using red toner in region B shown by the lattice pattern are not printed because symbols "*" indicating the characters are removed. In this embodiment, the color component of red is set to be removed, so the regions formed by using red toner are removed.

<Software Configuration of Image Forming Apparatus>

Figure 5:
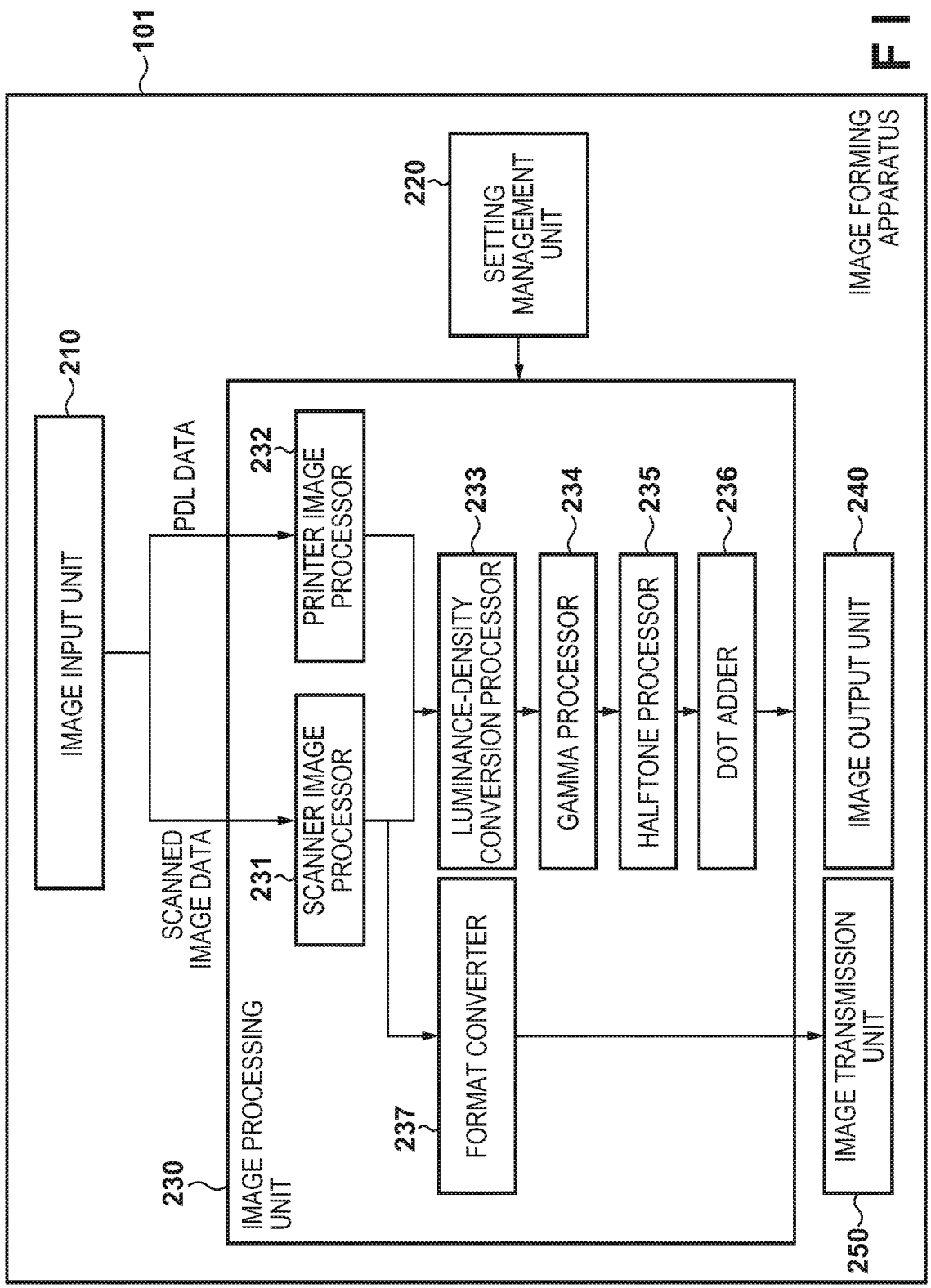
FIG. 5 is a block diagram showing an example of processing to be executed by the image forming apparatus.

FIG. 5 is a block diagram showing an example of the software configuration of the image forming apparatus 101 which operates the copy function, scan and transmission function, and print function. The image forming apparatus 101 includes an image input unit 210, a setting management unit 220, an image processing unit 230, an image output unit 240, and an image transmission unit 250 as functional units. The CPU 111 of the image forming apparatus 101 implements these functional units by executing the control program. Each functional unit will be explained below.

The image input unit 210 receives inputting of image data corresponding to the copy function, scan and transmission function, and print function of the image forming apparatus 101. For example, the image input unit 210 acquires scan image data from the scanner unit 140 when executing the copy function or scan and transmission function, and acquires PDL data from the PC 102 when executing the print function.

The setting management unit 220 manages various setting values of various kinds of image processing to be executed by the image processing unit 230. Furthermore, the setting management unit 220 also performs control of acquiring a setting value by receiving a user's instruction from the UI screen displayed on the operation unit 120, and managing the setting value.

The image processing unit 230 performs various kinds of image processing corresponding to the function to be used, on the image acquired by the image input unit 210. The image processing unit 230 includes a scanner image processor 231, a printer image processor 232, a luminance-density conversion processor 233, a gamma processor 234, a halftone processor 235, a dot adder 236, and a format converter 237.

Figure 6:
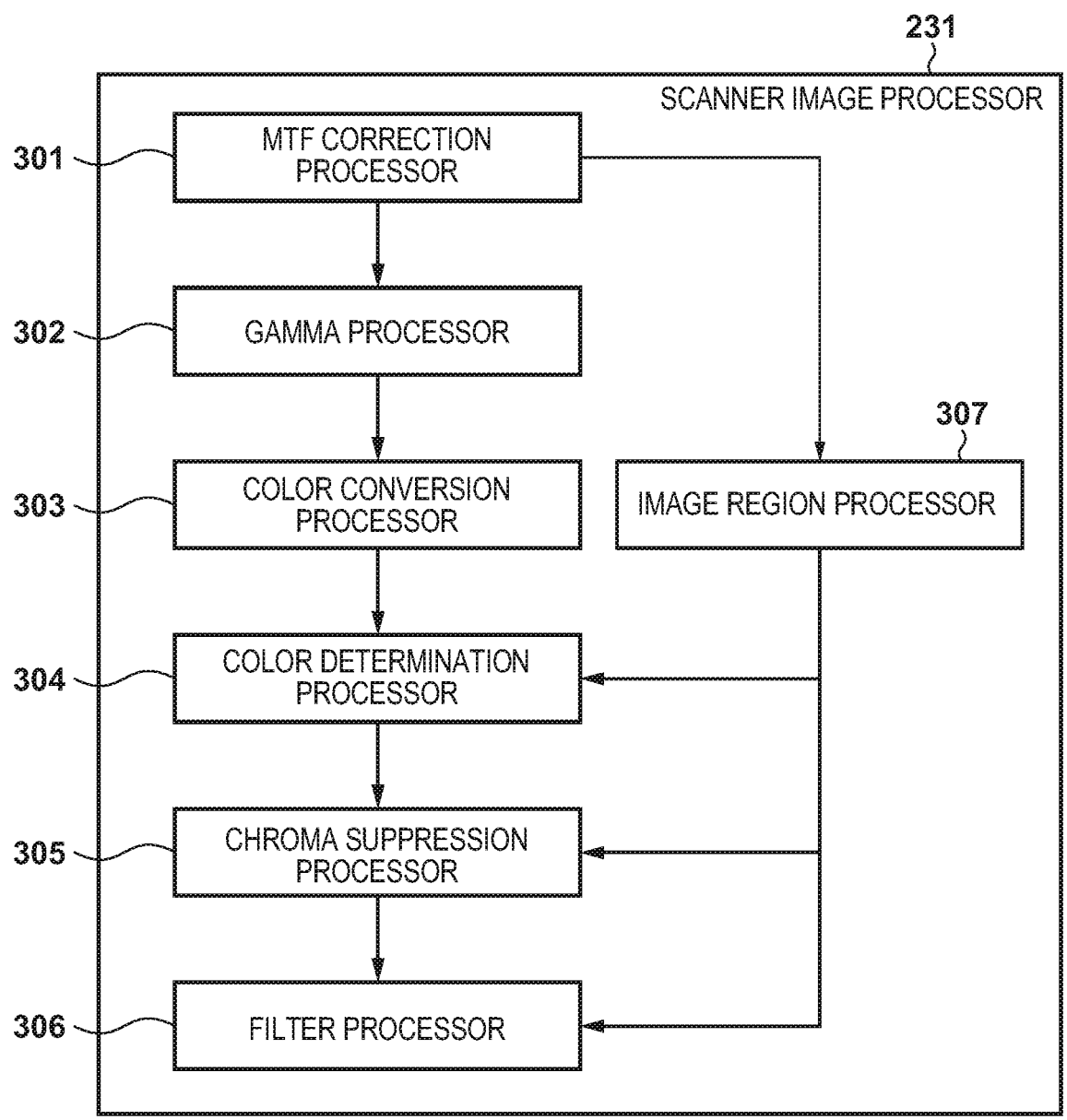
FIG. 6 is a block diagram showing an example of scanner image processing.

FIG. 6 is a block diagram showing an example of the software configuration of the scanner image processor 231. The scanner image processor 231 shown in FIG. 6 executes an image processing function, and performs image processing necessary for a scanned image. The scanner image processor 231 includes an MTF correction processor 301, a gamma processor 302, a color conversion processor 303, a color determination processor 304, a chroma suppression processor 305, a filter processor 306, and an image region processor 307.

First, the scanner image processor 231 includes the MTF correction processor 301 for correcting a reading MTF which changes in accordance with the reading speed, the one-dimensional gamma processor 302 corresponding to the scanner characteristics, and the color conversion processor 303 which converts the color space of the scanner into a color space independent of the scanner. The color conversion processor 303 performs the process of removing a designated color used in the present invention. Details will be described later.

The scanner image processor 231 further includes the image region processor 307 which determines the image regions of characters, pictures, and the like by using the image processed by the MTF correction processor 301, and the color determination processor 304, chroma suppression processor 305, and filter processor 306 which perform processing by using the image region information.

The color determination processor 304 determines whether the image is a chromatic color or achromatic color by using the image region information. The chroma suppression processor 305 corrects the amounts of RGB of the image found to be an achromatic color in accordance with the image region information. For example, when the color determination processor 304 determines that the image is an achromatic color, the chroma suppression processor 305 performs a process of equalizing the RGB amounts. The filter processor 306 performs smoothing, edge emphasis, and the like in accordance with the image region information.

The printer image processor 232 performs image processing required when executing the print function, for example, a process of generating intermediate data by interpreting PDL data, and an RIP process of converting the intermediate data into bitmap data which can be interpreted by the printer unit 130. In this RIP process, the above-described attribute information generating process is also performed.

The luminance-density conversion processor 233 performs a process of converting the color space (for example, RGB) of data generated by the scanner image processor 231 or printer image processor 232 into a color space (for example, CMYK) corresponding to the printer unit 130. Note that image data having the CMYK color space when input to the luminance-density conversion processor 233 is directly supplied to the gamma processor 234. The gamma processor 234 performs a process of correcting the density gradation of the printer unit 130 into a predetermined characteristic. The halftone processor 235 performs a process of converting the gradation values (for example, 256 gradation levels) of input image data into image data (halftone image data) having N values (for example, two values) as a gradation which can be output by the printer unit 130. The dot adder 236 adds a predetermined dot. The image output unit 240 outputs the halftone image data as a result of the various kinds of image processing performed on the input image data to the printer unit 130 via the printer I/F.

The format converter 237 converts the data generated by the scanner image processor 231 into a transmittable general-purpose format. For example, the format converter 237 converts the data into a JPEG (Joint Photographic Experts Group) format or PDF (Portable Document Format). The image transmission unit 250 transmits the image data as a result of the various kinds of image processing performed on the input image data to the PC 102 or the like across the LAN 103 via the network I/F.

The processes in S412, S413, and S414 described earlier, that is, the processing from image formation to image output will be explained in detail below.

In image formation S412, the image input unit 210 converts the image read in scan S411 into a bitmap image which can be processed in image processing.

When performing the copy function in image processing S413, the scanned image generated in image formation S412 is acquired, and the color conversion processor 303 in the scanner image processor 231 performs color conversion including the designated color removal process. For example, when the user has selected red as a designated color in selectin 531, the process of removing the color component of red from the scanned image is executed. Subsequently, the luminance-density conversion processor 233, gamma processor 234, halftone processor 235, and dot adder 236 perform processing.

In image output S414, the image output unit 240 prints the generated image. When this printing is executed, the image forming apparatus 101 outputs a document as the copying result printed by the printer unit 130.

<Method of Designated Color Removal>

Next, the three-dimensional LUT processing and the method of designated color removal when a specific color is designated, which are performed by the color conversion processor 303 in the scanner image processor 231, will be explained.

Regardless of whether to perform designated color removal or not, the color conversion processor 303 performs, on the image obtained by the scanner, a process of converting R, and B signals having characteristics depending on the device into color spaces R', G', and B' independent of the device by color space conversion. Although various conversion methods are available, a conversion process using a three-dimensional LUT will be explained as an example.

FIG. 7 shows examples of 4,096 tables thinned by 15. Outputs R, and B are determined as a table for inputs R, and B. That is, the table shown in FIG. 7 is a three-dimensional look-up table (LUT). For example, an input (0, 0, 15) is converted into an output (0, 0, 19). If the step value of an input is not 15, an output is obtained by interpolation from an adjacent number. By performing the conversion process using the three-dimensional LUT on all pixels of the input image, the device-dependent color space read by scanning is converted into a device-independent color space. In this LUT, the input values are associated with the indices shown in FIG. 7 in advance, and the output values are held as they are associated with these indices, thereby relating the input and output to each other, that is, relating the colors before and after the conversion to each other.

Designated color removal can be implemented by changing the three-dimensional LUT to be used in the conversion process performed by the color conversion processor 303. For example, when R, and B signals on the output side of the three-dimensional LUT correspond to a designated color received by the image forming apparatus 101, designated color removal is implemented by converting the contents of this three-dimensional LUT. That is, the designated color can be removed by converting RGB of the designated color such that (output R, output G, output B)=(255, 255, 255), thereby replacing RGB into a value representing white as a luminance signal. The three-dimensional LUT can be generated whenever the values of a removal color/removal region (details will be explained later) designated by the user are set, and can also be held for each designated color.

Also, since the processing is performed on the three-dimensional LUT in the RGB color space, it is effectively possible to solve a problem having arisen when performing the processing in the CMYK color space. For example, when removing cyan as a designated color in the CMYK color space, designated color removal can be implemented by not printing only cyan of CMYK toners used in image formation. However, when cyan is designated as a removal color and removed from a region of, for example, green expressed by cyan and yellow, only yellow is printed. The problem as described above is effectively prevented by performing removal in the RGB color space.

<Method of Generating Three-Dimensional LUT for Designated Color Removal>

Figure 8A:
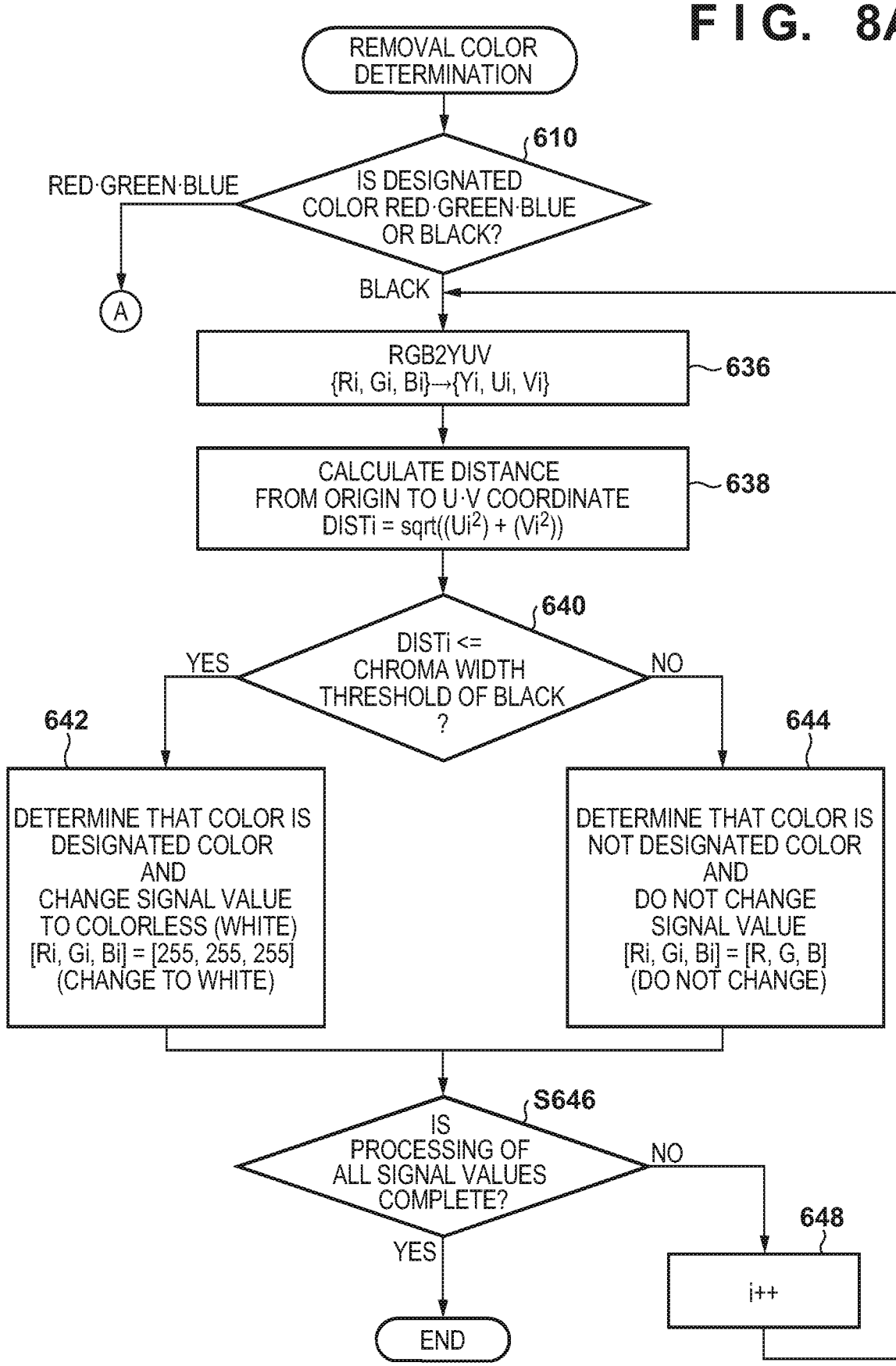
FIG. 8A is a detailed flowchart of the process of designated color removal.

A process of calculating a three-dimensional LUT capable of removing a designated color component received by the image forming apparatus 101 will be explained below with reference to FIGS. 8A and 8B. This process is performed by the color conversion processor 303, and implemented by the CPU 111 of the image forming apparatus 101 by executing the control program.

The input data are R, G, and B on the output side of the three-dimensional LUT, and the signal values of all tables (in this embodiment, 16×16×16 tables because the step value is 15) are processed. Output RGB values for converting the device-dependent color space into the device-independent color space can be set as initial values in this LUT. In addition, the chroma width threshold, hue central angle, and hue width threshold of each designated color are input as processing parameters. Note that the three-dimensional LUT for performing the processing and the input parameters to be used in the processing are saved in the ROM 112 and input from step 610 via the setting management unit 220. The input parameters will be described later. As will be described in the explanation, the designated color is specified in the LUV (luminance-color difference color system) color space converted from the RGB color space. Furthermore, in the LUV color space, the UV plane is indicated by the polar coordinate system (represented by, for example, (DIST, DEG) where DIST is the radius vector and DEG is the argument) having the luminance axis as the origin from the orthogonal coordinate system of UV. That is, the LUV color space is indicated by the cylindrical coordinate system of (L, DIST, DEG). The relationship between U, V, DIST, and DEG is given by the following equations. Note that the unit of the angle DEG is "degree", and the positive U-axis direction is the reference.

$$\text{DIST} = \sqrt{(U^2 + V^2)}$$

$$\text{DEG} = \cos^{-1}(U/\text{DIST}) \ (V \geq 0)$$

$$\text{DEG} = 180 + \cos^{-1}(U/\text{DIST}) \ (V < 0) \qquad (1)$$

In the following explanation, DEG will be called a hue angle or central angle, and DIST will be called chroma. DIST and DEG can mutually be converted into U and V in the above equations, so the ways of expression are merely different. The procedure shown in FIG. 6 is a procedure of reconfiguring the three-dimensional LUT in which the output RGB values for converting the device-dependent color space into the device-independent color space are set, and is executed by sequentially focusing attention on all the RGB values registered in the LUT in the order of indices shown in FIG. 7.

In step 610, whether the designated color received by the image forming apparatus 101 is a chromatic color such as red, green, or blue or an achromatic color such as black is determined. First, a process when one of red, green, and blue is selected as a designated color will be explained below.

When one of red, green, and blue is selected as the designated color, the process advances to step 620, and input Ri, Gi, and Bi are converted from the RGB color space into a luminance/color difference color space (for example, a YUV color space). The input Ri, Gi, and Bi are RGB values corresponding to index i to be focused in the three-dimensional LUT. This conversion from RGB into YUV is represented by:

$$Yi=0.299 \times Ri+0.587 \times Gi+0.114 \times Bi$$

$$Ui=-0.169 \times Ri-0.331 \times Gi+0.50 \times Bi$$

$$Vi=0.50 \times Ri-0.419 \times Gi-0.081 \times Bi$$

where i is the index number of an LUT as a processing target of all the tables.

In step 621, the distance from the origin (0, 0) to the (Ui, Vi) value is calculated based on the converted color difference signal (Ui and Vi of Yi, Ui, and Vi). For example, this distance is calculated by:

$$DISTi=sqrt((Ui \times Ui)+(Vi \times Vi))$$

The calculated value is called a chromatic value.

Figure 9A:
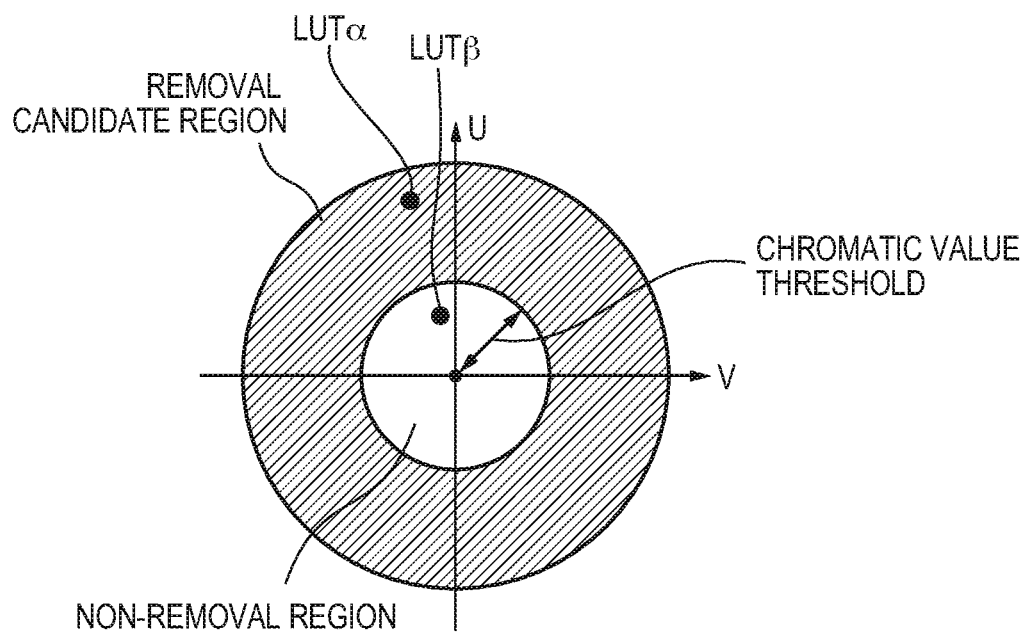
FIG. 9A is a view showing an example of designated color removal.

In step 622, whether the calculated chromatic value is higher or lower than a specific threshold (chromatic value threshold) is determined. The chromatic value threshold is preset as a parameter in the ROM 112, and the determination is performed by using this value. Note that the chromatic value threshold can also change from one designated color to another. If the calculated chromatic value is higher (larger) than the chromatic value threshold (if the calculated chromatic value is high chroma), the process advances to step 623. If the calculated chromatic value is lower (smaller) than the chromatic value threshold (if the calculated chromatic value is low chroma), the process advances to step 631. If the chromatic value of the input signal value is on the low-chroma side of the chromatic value threshold, it is determined that the color is not removed. If the chromatic value is on the high-chroma side of the chromatic value threshold, it is determined that the color is a removal candidate. Since the low-chroma color is not removed, it is possible to prevent a color close to an achromatic color from being removed. FIGS. 9A to 9D show hue circles on the color difference space plane. In FIG. 9A, the inside circle indicates the chromatic threshold. A hatched region in FIG. 9A is a color having chroma higher than the threshold, and is a color as a removal candidate. When the input LUT is plotted on the point of LUTα, the color is a removal candidate. When the input LUT is plotted on the point of LUTβ, the color is not removed.

Figure 9B:
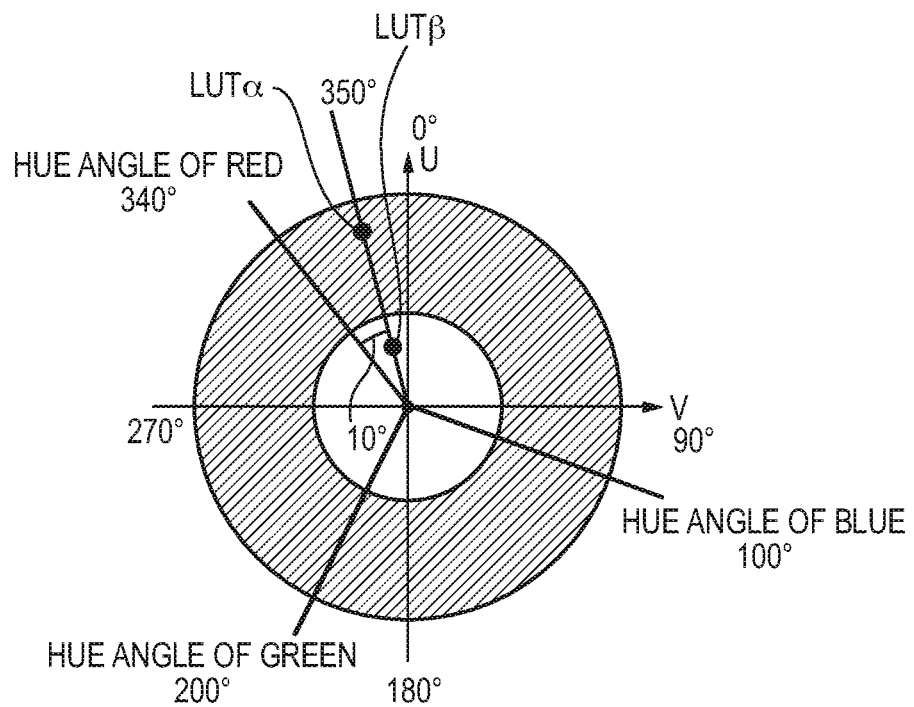
FIG. 9B is a view showing an example of designated color removal.

In step 623, the process branches in accordance with whether the designated color received by the image forming apparatus 101 is red, green, or blue. The process advances to step 624 if the designated color received by the image forming apparatus 101 is red, to step 625 if the designated color received by the image forming apparatus 101 is green, and to step 626 if the designated color received by the image forming apparatus 101 is blue. In step 624, 625, or 626, the central angle on the reference U-V plane of the designated color of R, and B is set as the hue angle. As shown in FIG. 9B, the origin on the U-V plane is the center, and the apex side (the positive side of the U axis) is 0°. The reference hue angle of each color is preset and held as a parameter within the range to 359° in the clockwise direction, and the value of each hue angle is used. For example, as shown in FIG. 9B, the red hue angle, green hue angle, and blue hue angle are respectively set at 340°, 200°, and 100°.

In step 627, an angle (U·V hue angle) DEGi on the U-V plane is calculated based on the converted color difference signal (Ui and Vi of Yi, Ui, and Vi). The calculation formula can be equations (1) presented earlier. Both of LUTα and LUTβ shown in FIG. 9B indicate an example in which an angle of 350° is calculated.

In step 628, the angular difference (hue angular difference) of the U·V hue angle DEGi corresponding to the RiGiBi value of interest in the LUT calculated from the reference hue angle set in step 624, 625, or 626 and the color difference signal converted in step 627 is calculated by:

$$DIFF\_DEGi=|(U \cdot V \text{ hue angle of LUT})DEGi-(\text{reference hue angle})|$$

For example, when the designated color received by the image forming apparatus 101 is red, the angular difference between the hue angle of red set in step 624 and the hue angle of the color of interest calculated in step 627 is calculated. When the designated color received by the image forming apparatus 101 is red, the reference hue angle value set in step 624 is 340°. Also, the U·V hue angle calculated in step 627 is 350° for both LUTα and LUTβ, the hue angular difference is 10° for both LUTα and LUTβ.

Figure 9C:
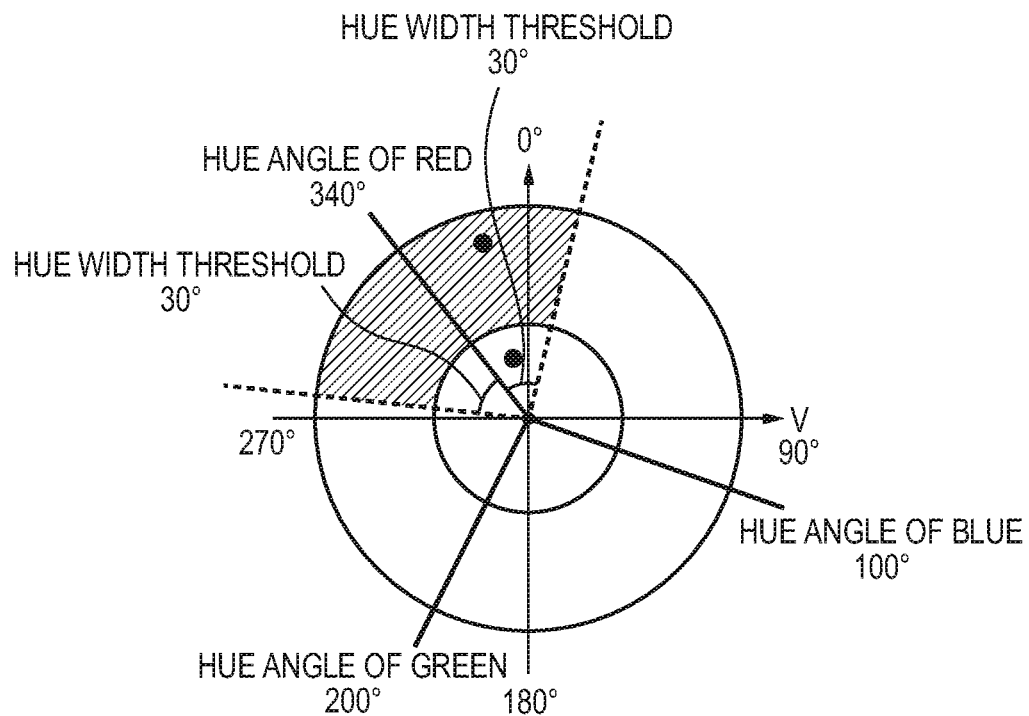
FIG. 9C is a view showing an example of designated color removal.

In step 629, whether the hue angular difference calculated in step 628 exceeds the hue width threshold of each color is determined. If the hue angular difference is equal to or smaller than the hue width threshold, the process advances to step 630. If the hue angular difference is larger than the hue width threshold, the process advances to step 631. Referring to FIG. 9C, when the hue central angle of red is the center, whether the hue angle enters the region of the hue width threshold on the two sides is determined. For example, when the hue width threshold is 30°, a point (that is, a color region) falling within the range of red hue angle 340°±hue width threshold 30° is set as the removal range. Accordingly, a color region within the hue angle from 340°−30° (=310°) to 340°+30°(=370°(=10°)) is removed.

In step 630, the RiGiBi value of the LUT found to be removed in step 629 is changed into a signal value which is not printed. For example, the luminance signal value is changed into (Ri, Gi, Bi)=(255, 255, 255) which is a value representing white.

In step 631, the RiGiBi value of the LUT found not to be removed in step 629 is kept unchanged from the input signal.

In step 632, the process branches based on whether all the RGB values in the LUT are determined. If determination of all signals is not complete, 1 is added to index i in step 633 in order to process the next LUT, and the processing from step 622 is performed. Since the step value of the LUT explained in this embodiment is 15, 16×16×16 tables will be explained as an example. When determination of all signals is complete, the process is terminated.

A process when black is selected as the designated color will now be explained.

When the designated color is black, the process branches from step 610 to step 636. Steps 636 and 638 are respectively the same as steps 620 and 621, so an explanation thereof will be omitted.

In step 640, whether the calculated chromatic value is higher or lower than a specific threshold (chromatic value threshold) is determined. The chromatic value threshold is preset and held as a parameter in the ROM 112, and the determination is performed by using this value. The determination method is: if the calculated chromatic value is lower than the chromatic value threshold (if the calculated chromatic value is low chroma), the process advances to step 642; if the calculated chromatic value is higher than the chromatic value threshold (if the calculated chromatic value is high chroma), the process advances to step 644.

Figure 9D:
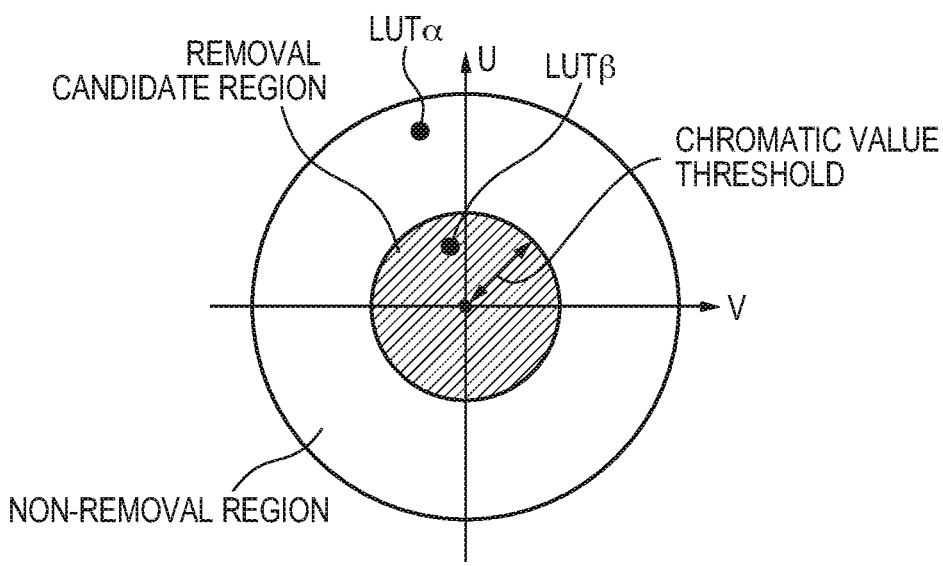
FIG. 9D is a view showing an example of designated color removal.

At this point of time, if the chromatic value of the input signal value is on the high-chroma side of the chromatic value threshold, it is determined that no removal is performed. On the other hand, if the chromatic value is on the low-chroma side of the chromatic value threshold, it is determined that removal is performed. Since a high-chroma color is not removed, it is possible to prevent a color close to a chromatic color from being removed. A hatched region shown in FIG. 9D is the removal range. If the input LUT is plotted on the point of LUTα, the color is not removed. If the input LUT is plotted on the point of LUTβ, the removal range is set.

Steps 642, 644, 646, and 648 are respectively the same as steps 630, 631, 632, and 633, so an explanation thereof will be omitted.

By the above processing, the input three-dimensional LUT can be rewritten to an LUT which can be removed in accordance with the designated color received by the image forming apparatus 101. By performing color conversion by using this reconfigured LUT, the designated color can also be removed. Thus, if the color designated as a removal target is a chromatic color, a color range within which the color difference from the designated color is smaller than a predetermined amount and the chroma is larger than a predetermined value is replaced with white, and, if the designated color is an achromatic color, a color range within which the chroma is equal to or smaller than a predetermined value is replaced with white. A color conversion LUT like this is reconfigured from the original LUT, or an LUT like this is formed.

<Parameters to be Used in Designated Color Removing Process>

As described above, when generating the three-dimensional LUT, the chroma width threshold, hue central angle, and hue width threshold of each designated color are input as processing parameters in addition to the R, and B tables on the output side of the three-dimensional LUT. These parameters to be used in the processing and parameters changeable in user's applied setting will be explained below. Note that the input parameters to be used in the processing are saved in the ROM 112 and input in step 610 via the setting management unit 220.

The parameters can be changed and can also be designated directly from a UI. In this embodiment, an arrangement in which preset values are used and parameters to be used are switched by user's designation will be explained. This switching can be performed through a user interface shown in, for example, FIG. 3D or 3E. Designation "widen removable range" is possible in FIG. 3D, and tint adjustment is possible in FIG. 3E.

FIG. 10A shows reference values of the chroma width threshold, hue central angle, and hue width threshold when designating each color. The values are switched for each designated color received by the image forming apparatus 101 in designated color removal setting designation S406. FIG. 10A shows values when no applied setting is performed as default, and shows the chroma width thresholds, hue central angles, and hue width thresholds when red, green, blue, and black are designated. The values of the chroma width threshold, hue central angle, and hue width threshold can be changed for each designated color. The chroma width threshold is held for each designated color, but the hue central angle and hue width threshold are not held for black because they are parameters to be used only when designating red, green, or blue.

Figure 3D:
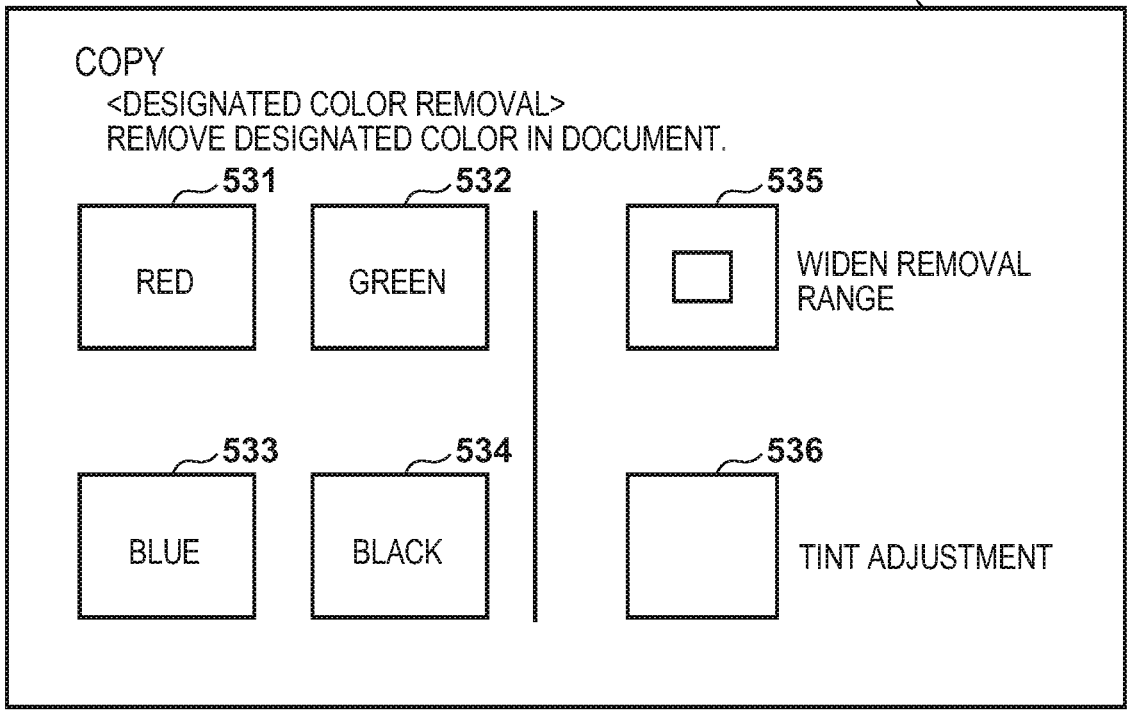
FIG. 3D is a view showing an example of a UI for removing a designated color.
Figure 14:
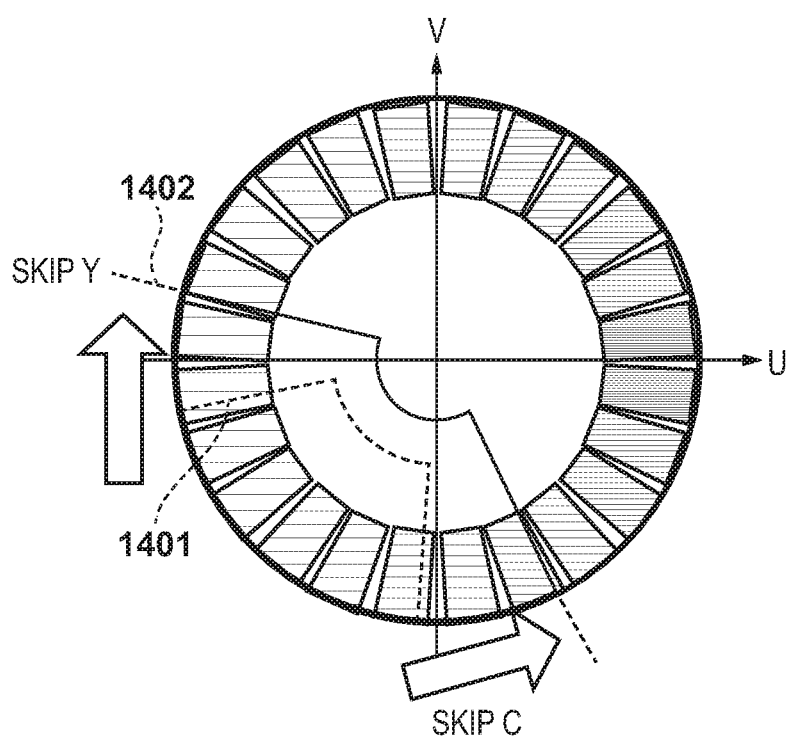
FIG. 14 is a view showing an example of extension of a chromatic color to be removed on a UV plane.

Parameter examples when "widen removal range" 535 shown in FIG. 3D is designated in designated color removal detailed setting instruction S408 are shown in "removal range widening mode" of FIG. 10A. Compared to the defaults, values capable of removing broader ranges are held. The chroma width threshold when designating red, green, or blue is set as a coefficient capable of removing a range widened to the achromatic side by making the value more achromatic than the default. When the designated color is red, for example, the chroma width threshold is −16, that is, widened toward the achromatic side by 16 points, and the hue width threshold is widened from the hue central angle by +5°. This similarly applies to green and blue although numerical values are different. FIG. 14 shows a schematic view on this color space. FIG. 14 shows an example when the designated color is green. A range 1401 is a default removal target range, and a range 1402 is an extended removal target range. The center of the range 1402 matches that of the default range, but the hue width is extended to the two sides, that is, cyan and yellow. In addition, the range is widened in the achromatic color direction (origin direction). Thus, the hue width threshold when designating red, green, or blue is set as a coefficient capable of removing a range widened to another hue side by making the hue wider than the default. The hue central angle is kept unchanged from the default.

Figure 15A:
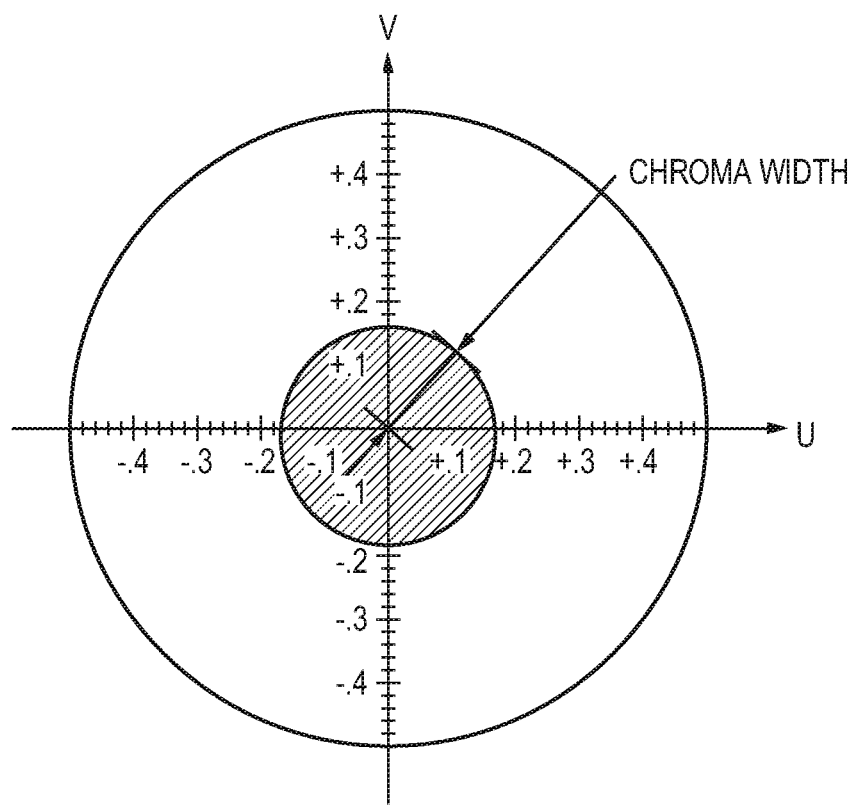
FIG. 15A is a view showing an example of extension of an achromatic color to be removed on a UV plane.
Figure 15B:
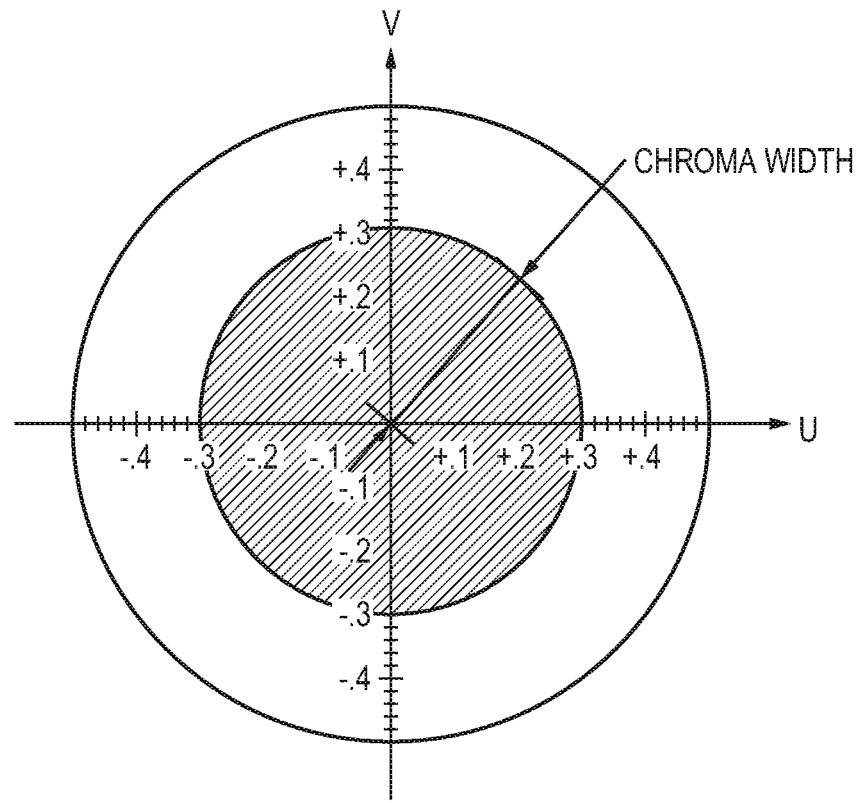
FIG. 15B is a view showing an example of extension of an achromatic color to be removed on a UV plane.

On the other hand, the chroma width threshold when designating black is set as a coefficient capable of removing a range widened to the chromatic side by making the value more chromatic than the default. FIGS. 15A and 15B show an example FIG. 15A shows a default range, and FIG. 15B shows an extended range. Thus, the chroma width is increased by extension when designating black. As the parameters herein explained, the processing is performed by using the chroma width threshold in 622 and 640, the hue central angle in 624, 625, and 626, and the hue width threshold in 629.

In this embodiment, the method of designating and removing a color, such as red, blue, or green, which is formed by mixing two or more colors in an output color space such as YMC has been explained. However, it is also possible to remove single colors such as cyan, magenta, and yellow. On a document formed by single colors, no color misregistration occurs during printing. Accordingly, it is possible to adopt an arrangement in which the same value as the default is used as the hue width threshold although the chroma width threshold is changed. Note that "single color" is the color component of a coloring material forming an image on a document. For example, when an image on a document is formed by YMCK toners, the color components of Y, M, and C are single colors. K is not a removal target because K is achromatic although it is a single color. As described above, each threshold can also be changed in accordance with the designated color.

FIG. 10B shows parameter examples when "tint adjustment" 536 is designated in designated color removal detailed setting instruction S408. The default hue central angles are respectively 340°, 200°, and 100° for red, green, and blue, and the hue width threshold is 30°. When red is selected, for example, 340°+10°=350° is the adjusted hue central angle if "near magenta by one step" is selected. If "near magenta by one more step" is designated, the hue central angle is further incremented by +10°. On the other hand, if "near yellow" is designated, the hue central angle is reduced by 10° for each step. The target color to be removed is thus adjusted from the default by changing the hue central angle.

Figure 3E:
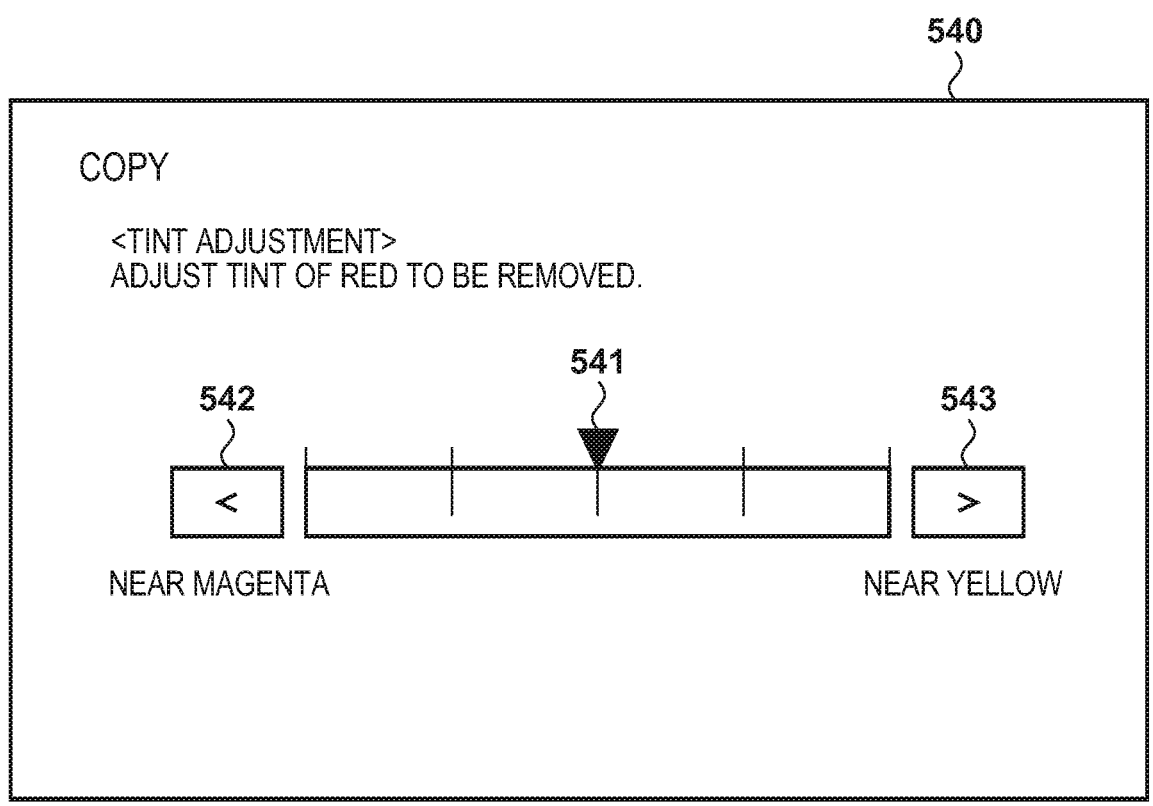
FIG. 3E is a view showing an example of a UI for removing a designated color.
Figure 13A:
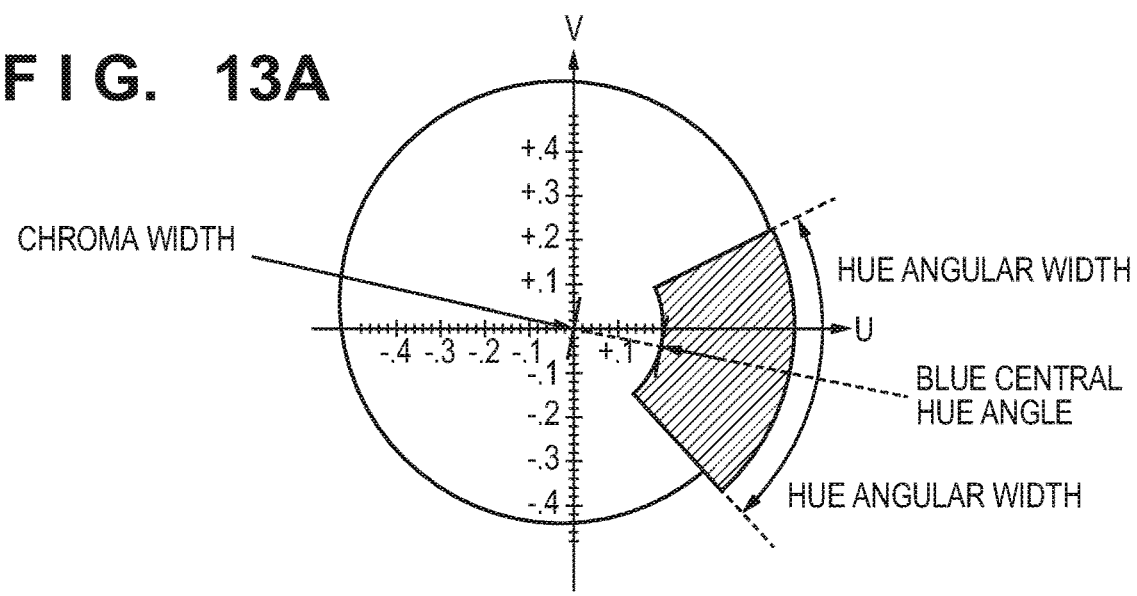
FIG. 13A is a view showing an example of adjustment of a color to be removed on a UV plane.
Figure 13B:
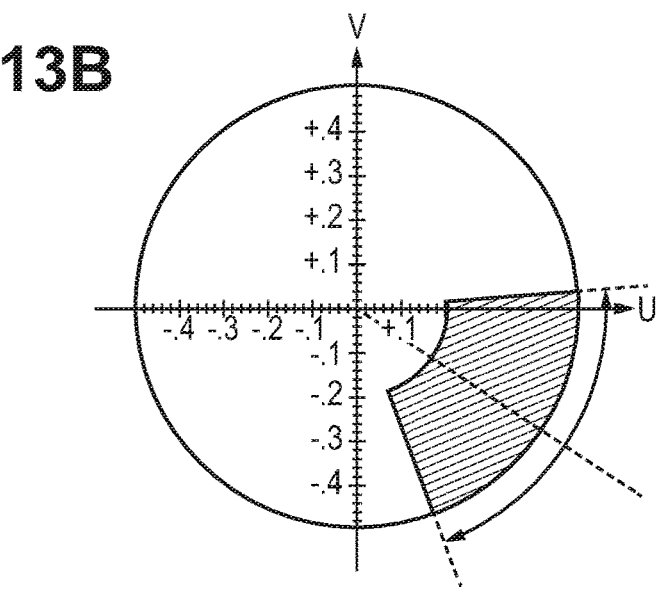
FIG. 13B is a view showing an example of adjustment of a color to be removed on a UV plane.
Figure 13C:
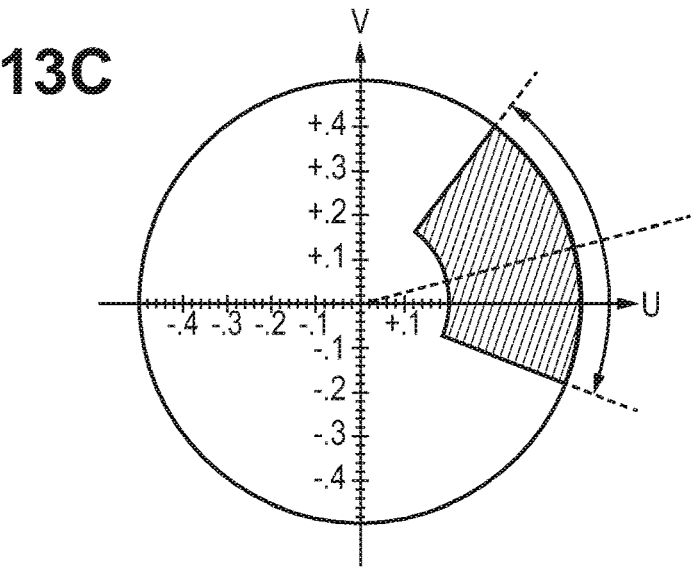
FIG. 13C is a view showing an example of adjustment of a color to be removed on a UV plane.

For example, FIG. 3E shows a tint adjustment user interface 540 when the designated color is red. In this user interface, the hue can be changed from the default hue central angle to the magenta side or yellow side by a predetermined number of steps. In this example shown in FIG. 3E, the number of steps is two for each of magenta and yellow from the default hue in the center. As a method of designation by the user, the user can adjust the hue in each color direction by operating buttons 542 and 543 in the UI shown in FIG. 3E. The hue is the default value 541 before adjustment. Note that as the parameters herein explained, the processing is performed by using the hue central angle in steps 624, 625, and 626 of FIG. 8B. FIGS. 13A, 13B, and 13C are schematic views of hue adjustment on the UV plane. FIGS. 13A, 13B, and 13C show examples in which green is selected as the target color to be removed. FIG. 13A shows default settings. FIG. 13B shows an example in which the hue is adjusted toward yellow by two steps. FIG. 13C shows an example in which the hue is adjusted toward magenta by two steps. In this case, only the central angle changes, and the chroma width and hue width remain unchanged. Also, "widen removal range" 535 and "tint adjustment" 536 shown in FIG. 3D can be adjusted independently of each other. That is, it is possible to designate only one of them or execute both of them. More specifically, it is possible to independently perform hue adjustment and adjustment of the hue width and/or the chroma width.

In this embodiment, the arrangement in which the set values are switched within the range of some steps on the UI and the preset parameter values are used has been explained. However, it is also possible to adopt an arrangement in which the user can directly change the parameter values by preparing a UI which allows the user to directly change the parameters. If an arbitrary value can be input as an adjustment value, however, an entirely different hue may be designated by adjustment. Therefore, it is also possible to set the upper limit of the adjustment value. Furthermore, this upper limit of adjustment can be set such that the hue central angle can be adjusted degree by degree from 0° to 360°. Alternatively, the hue width and hue central angle can also be adjusted such that the range of the target color to be removed can cover all hues. FIG. 9C shows an example. When red is selected as the target color to be removed, the default removal target range is 340°±30°, that is, 310° to 370° for the hue. When the color is adjusted toward magenta by two steps by extending the hue width, the range of the target color to be removed is 360°±35°. That is, the range is 325° to 395° (=35°). On the other hand, when blue is designated and the hue width is extended by adjusting the hue toward magenta, the range is 80°±40°, so the removal range is 40° to 120°. This reveals that a hue of 35° to 40° is a color which cannot be removed even by adjustment. Therefore, a range which cannot be removed by the above example can also be set as a removal range by enlarging the adjustment amount of the hue central angle, or further extending the hue width.

Note that the process of the copy function has been explained in this embodiment. However, functions other than the copy function can also be performed by executing the processing by the color conversion processor 303 in the scanner image processor 231. For example, it is possible to use any functions using a scanning process, such as a scan and transmission function of transmitting a scanned image to a PC or the like, a scan and save function of saving a scanned image in the image forming apparatus 101 or the like, and a FAX transmission function.

As described above, when performing designated color removal, the user can remove only a designated color region from a document while solving the problem that even a low-chroma color of the designated color is removed, and the problem that it is impossible to limitedly remove an achromatic color such as black or gray. In addition, a target color to be removed can be designated more flexibly.

Second Embodiment

In the first embodiment, the arrangement which specifies and removes only a designated color region using the color difference value (that is, the hue angle) in the luminance-color difference color space such as the YUV color space has been explained. In the second embodiment, an arrangement which specifies a designated color region by using a luminance signal value in addition to the color difference value will be explained.

Figure 8B:
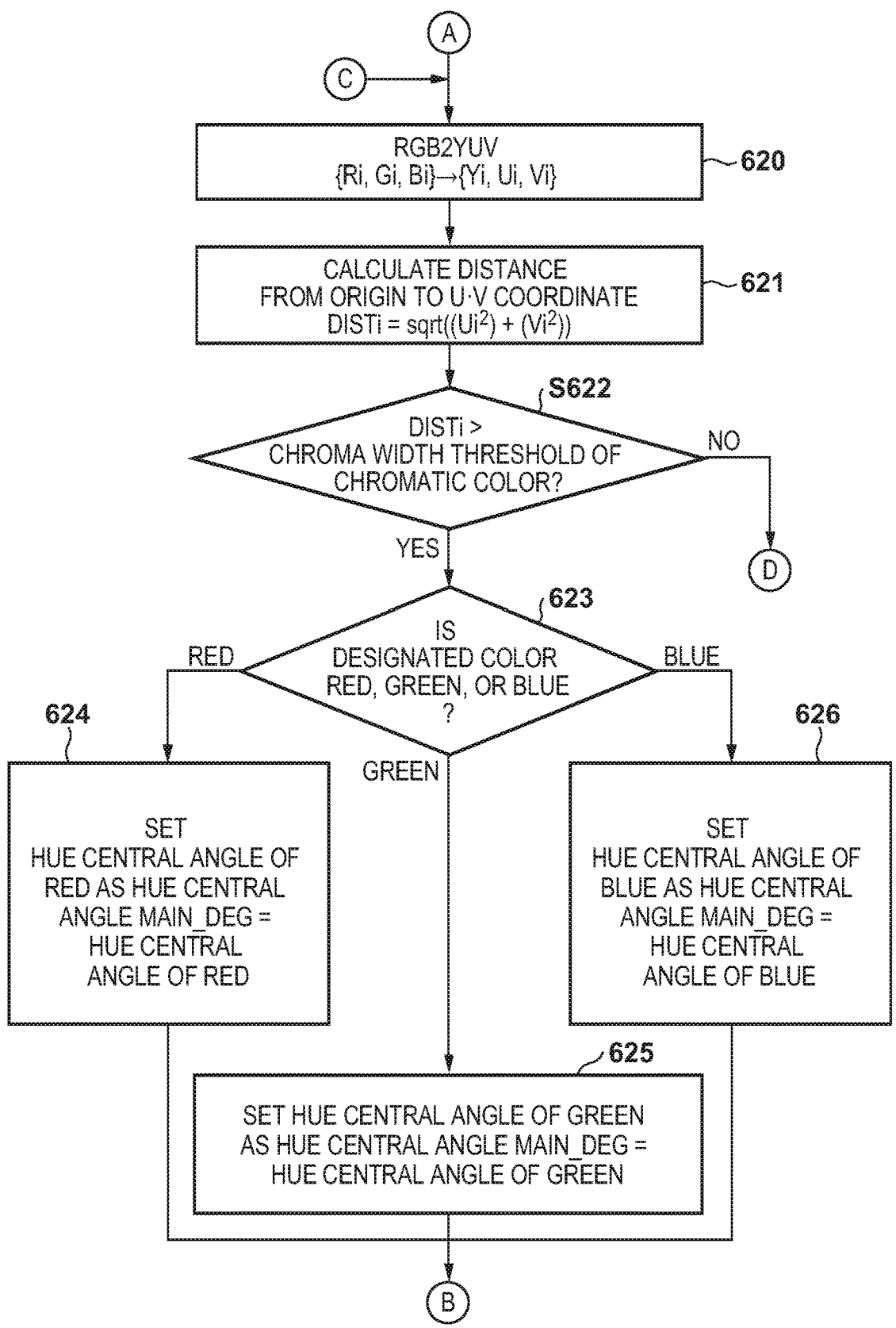
FIGS. 8B and 8C are detailed flowcharts of the process of designated color removal.
Figure 8C:
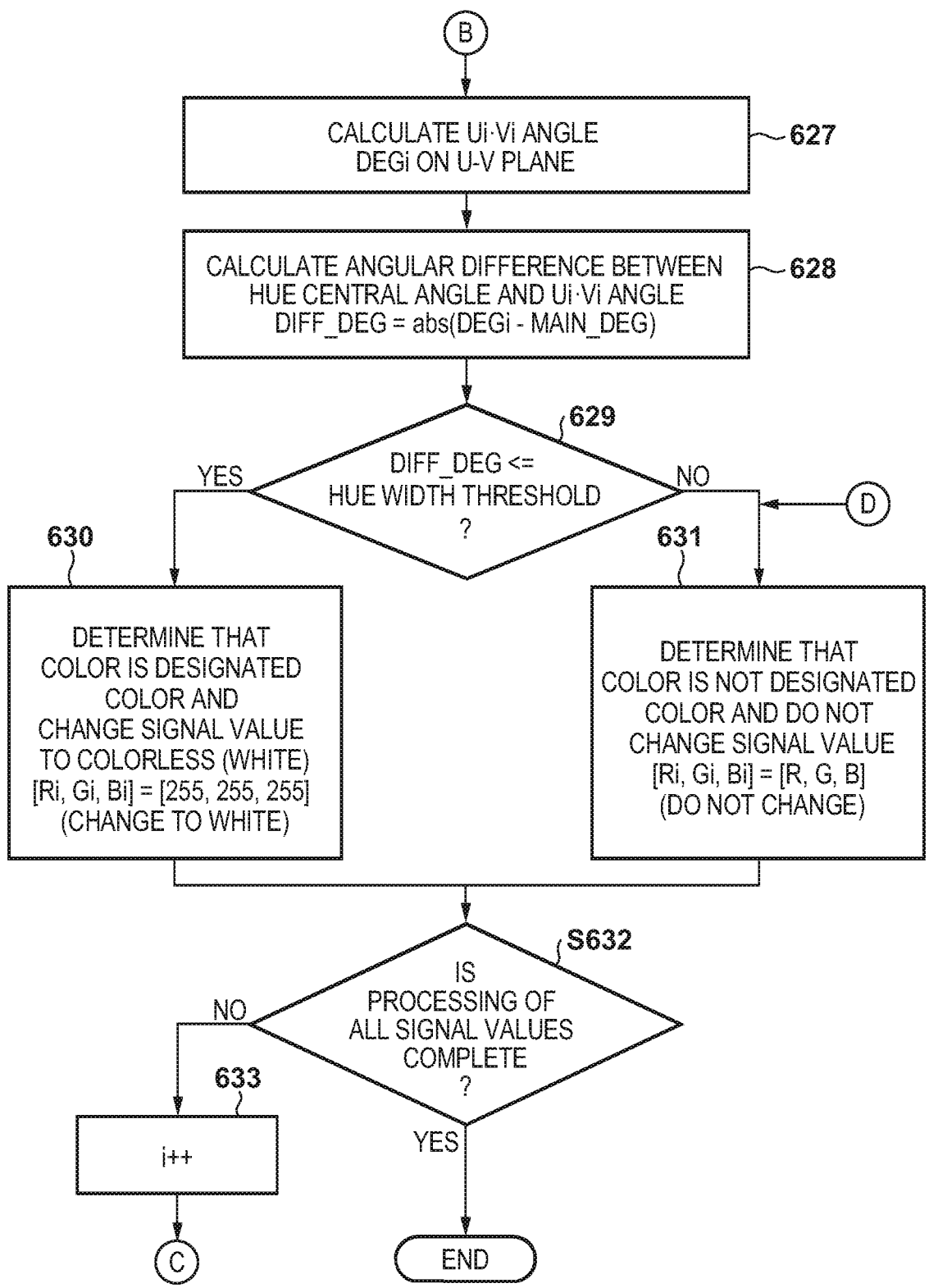

Referring to FIGS. 8B and 8C, determination is performed based on the distance to the chroma value in step 622, and a designated color is determined based on the hue angular difference in step 629. However, when the designated color is a light color or dark color, a color not intended by the user may be removed if determination is performed by the thresholds of only the chroma and hue.

Accordingly, an arrangement in which the luminance value Y acquired in step 620 is used in steps 622 and 629 will be explained. The thresholds to be used in the determination unit in steps 622 and 629 are switched in accordance with the luminance value Y acquired in step 620. For example, when the calculated luminance range is 0 to 255, this range is divided into a low-luminance region from 0 to 86, an intermediate-luminance region from 87 to 172, and a high-luminance region from 173 to 255. Different chroma width thresholds and different hue width thresholds corresponding to these luminance regions are held in the ROM 112. A luminance region to which the calculated luminance belongs is determined, and the processes in steps 622 and 629 shown in FIGS. 8B and 8C are performed by using the chroma width threshold and hue width threshold corresponding to the luminance region.

This makes it possible to remove a color matching the designated color even when the designated color is a light color or dark color.

Third Embodiment

Figure 11:
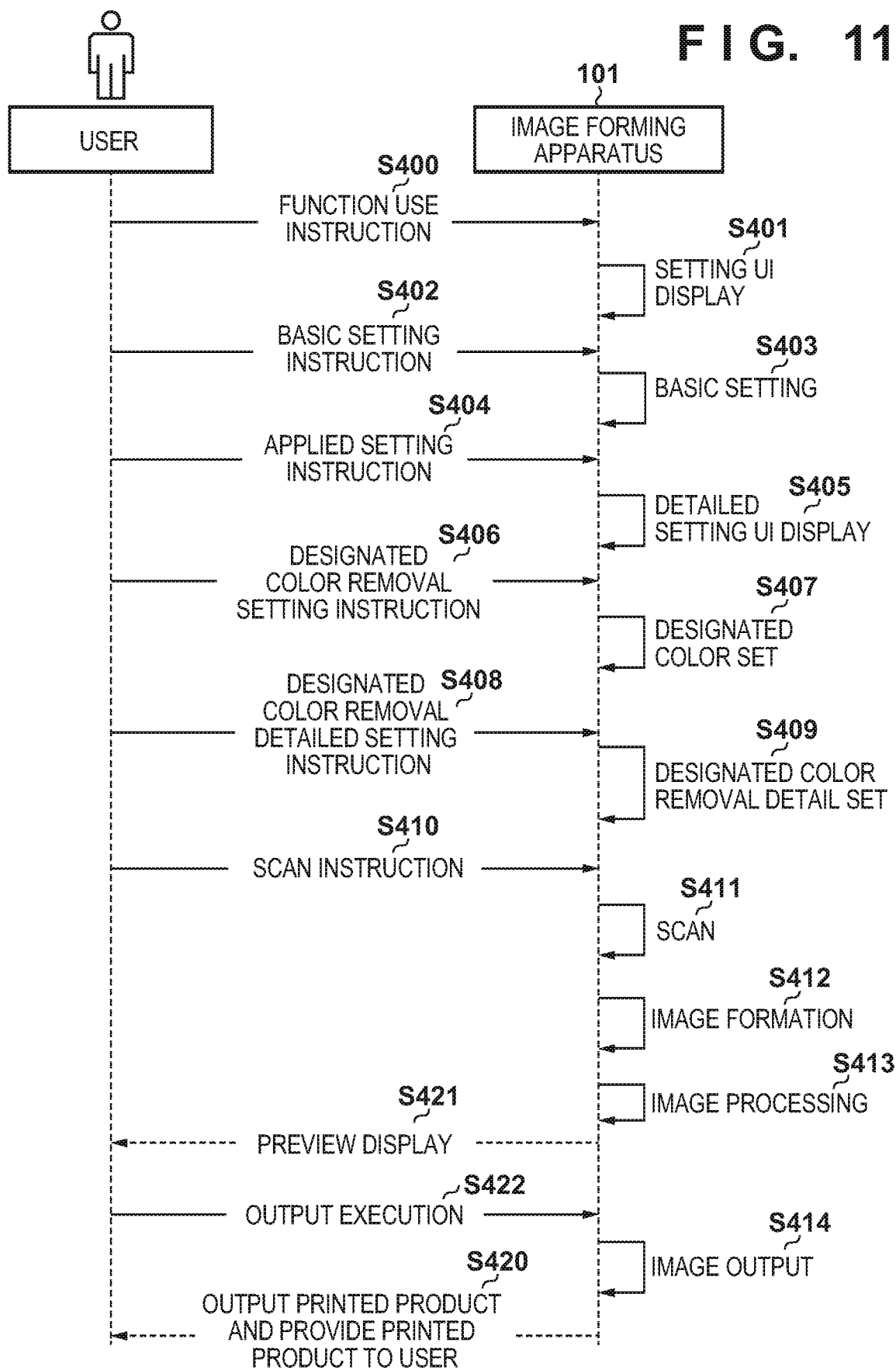
FIG. 11 is a sequence diagram showing exchange between a user and the image forming apparatus.

In the first and second embodiments, the process of executing copying after deciding the designated color removal setting received by the image forming apparatus 101 has been explained. However, the user cannot confirm a color of an actual document to which the set removal region corresponds. Therefore, an arrangement capable of performing preview display S421 and output execution S422 in addition to the configuration from S400 to S420 in FIG. 2 will be explained below with reference to FIG. 11.

In preview display S421, the removal result formed in S413 is presented to the user, and the user confirms the removal result.

After the user has confirmed the result in preview display S421, output execution S422 is performed. If the user wants to change the removal result after having confirmed the result, the user can change the settings by performing designated color removal setting instruction S406 or designated color removal detailed setting instruction S408. Consequently, the user can perform printing or the like after confirming the result preview of designated color removal, thereby avoiding a printing error.

FIG. 12 shows an image of the UI for preforming preview. The operation unit 120 of the image forming apparatus 101 displays a preview display UI 550. The preview display UI 550 displays an unprocessed image 551 of designated color removal and a processed resultant image 552 of designated color removal. In addition, a print button 553 and a setting change button 554 are prepared on the screen. When immediately performing printing after confirming the processed resultant image 552 of designated color removal, pressing of the print button 553 is received, and printing is executed. When changing the setting of designated color removal, pressing of the setting change button 554 is received, and the display is changed again to the UI 530 for setting designated color removal.

Fourth Embodiment

In the first, second, and third embodiments, the arrangement in which the designated color receivable by the image forming apparatus 101 is one color has been explained. In the fourth embodiment, an example of an arrangement in which the image forming apparatus 101 can receive a plurality of colors as designated colors will be explained.

In this arrangement, it is possible to simultaneously select red 531 by setting red as a designated color and blue 533 by setting blue as a designated color in FIG. 3D. As the removal process, the processing in FIGS. 8A and 8B as the three-dimensional LUT flow formed for designated color removal is executed a number of times equal to the number of designated colors, thereby generating a three-dimensional LUT capable of removing a plurality of colors. The color conversion processor 303 in the scanner processor 231 executes the process by using the generated three-dimensional LUT for removing a plurality of colors.

When removing a plurality of colors such as two or three colors, it is also possible to remove a hue region sandwiched between color removal ranges designated by the plurality of colors. For example, when red and green are selected as designated colors, it is also possible to remove a yellow region having a hue intermediate between the two colors in the hue circle on the color difference space.

The above method makes it possible to perform designated color removal by designating a plurality of colors instead of one color.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-149312, filed Aug. 1, 2017, which is hereby incorporated by reference herein in its entirety.

What is claimed is:

1. An image processing apparatus comprising:
    a receiving unit configured to receive designation of a color to be replaced with a white pixel in a scanned image; and
    a replacing unit configured to replace a pixel having a first color whose chroma is higher than a first threshold and whose hue falls within a hue range corresponding to the designated color, with the white pixel if the designated color is a chromatic color, wherein the replacing unit replaces a pixel having a second color, whose chroma is not higher than a second threshold, with the white pixel if the designated color is black.

2. The apparatus according to claim 1, wherein
    the receiving unit further comprises an adjusting unit configured to adjust a hue of the designated color to be replaced, and
    wherein the replacing unit replaces a pixel having the first color, whose chroma is higher than the first threshold and whose hue falls within a hue range corresponding to the adjusted designated color, with a white pixel if the adjusted designated color is a chromatic color.

3. The apparatus according to claim 1, wherein
    the receiving unit further comprises a changing unit configured to change the hue range corresponding to the designated color, and
    wherein the replacing unit replaces a pixel having the first color, whose chroma is higher than the first threshold and whose hue falls within the changed hue range corresponding to the designated color, with a white pixel if the designated color is a chromatic color.

4. The apparatus according to claim 3, wherein the changing unit further changes the first threshold, and the replacing unit replaces a pixel having the first color, whose chroma is higher than the changed first threshold and whose hue falls within the changed hue range corresponding to the designated color, with a white pixel if the designated color is a chromatic color.

5. The apparatus according to claim 3, wherein the changing unit further changes the second threshold, and
    the replacing unit replaces a pixel having the second color, whose chroma is not higher than the changed second threshold, with the white pixel if the designated color is black.

6. The apparatus according to claim 4, wherein the changing unit can independently change the hue range corresponding to the designated color and the first threshold.

7. The apparatus according to claim 4, wherein if the received designated color is a color of a coloring material forming a document image of the scanned image, the changing unit changes the first threshold but does not change the hue range.

8. The apparatus according to claim 1, wherein
    the replacing unit includes a forming unit configured to form a look-up table in which colors before and after conversion are associated with each other, and replaces, with a white pixel, a pixel having the first color, whose chroma is higher than a first threshold and whose hue falls within a hue range corresponding to the designated color, by referring to the look-up table, and the forming unit forms the look-up table such that a pixel of a color to be replaced with a white pixel is associated with a white pixel.

9. The apparatus according to claim 1, further comprising:

an obtaining unit configured to obtain the scanned image by scanning a document; and an image forming unit configured to form an image based on the scanned image, wherein the image forming unit forms an image based on image data in which a color is replaced by the replacing unit.

10. An image processing method comprising:

receiving designation of a color to be replaced with a white pixel in a scanned image;

replacing a pixel having a first color, whose chroma is higher than a first threshold and whose hue falls within a hue range corresponding to the designated color, with a white pixel if the designated color is a chromatic color; and replacing a pixel having a second color, whose chroma is not higher having not more than a second threshold, with a chroma larger than zero with the white pixel if the designated color is black.

11. The method according to claim 10, further comprising:

adjusting a hue of the designated color to be replaced, and wherein the replacing replaces a pixel having the first color, whose chroma is higher than the first threshold and whose hue falls within a hue range corresponding to the adjusted designated color, with a white pixel if the adjusted designated color is a chromatic color.

12. The method according to claim 10, further comprising:

changing the hue range corresponding to the designated color, and wherein the replacing replaces a pixel having the first color, whose chroma is higher than the first threshold and whose hue falls within the changed hue range corresponding to the designated color, with a white pixel if the designated color is a chromatic color.

13. The method according to claim 12, further comprising changing the first threshold, and wherein the replacing replaces a pixel having the first color, whose chroma is higher than the changed first threshold and whose hue falls within the changed hue range corresponding to the designated color, with a white pixel if the designated color is a chromatic color.

14. The method according to claim 12, further comprising changing the second threshold, and wherein the replacing replaces a pixel having the second color, whose chroma is not higher than the changed second threshold, with the white pixel if the designated color is black.

15. The method according to claim 13, wherein the changing can independently change the hue range corresponding to the designated color and the first threshold.

16. The method according to claim 14, wherein if the designated color is a color of a coloring material forming a document image of the scanned image, the changing changes the first threshold but does not change the hue range.

17. The method according to claim 10, wherein the replacing includes forming a look-up table in which colors before and after conversion are associated with each other, and replaces, with a white pixel, a pixel having the first color, whose chroma is higher than a first threshold and whose hue falls within a hue range corresponding to the designated color, by referring to the look-up table, and the forming forms the look-up table such that a pixel of a color to be replaced with a white pixel is associated with a white pixel.

18. The method according to claim 10, further comprising:

obtaining the scanned image by scanning a document; and forming an image based on the scanned image, wherein the image forming forms an image based on image data in which a color is replaced by the replacing.

19. A non-transitory computer-readable storage medium storing a program, which causes a computer to execute an image processing method by executing the program, the method comprising:

receiving designation of a color to be replaced with a white pixel in a scanned image;

replacing a pixel having a first color, whose chroma is higher than a first threshold and whose hue falls within a hue range corresponding to the designated color, with the white pixel if the designated color is a chromatic color; and replacing a pixel having a second color, whose chroma is not higher than a second threshold, with the white pixel if the designated color is black.

* * * * *